(12) United States Patent
Kubota et al.

(10) Patent No.: US 11,425,623 B2
(45) Date of Patent: Aug. 23, 2022

(54) BEAM SELECTION FOR UPLINK AND DOWNLINK BASED MOBILITY

(71) Applicant: QUALCOMM Incorporated, San Diego, CA (US)

(72) Inventors: Keiichi Kubota, Tokyo (JP); Tingfang Ji, San Diego, CA (US); Tao Luo, San Diego, CA (US); Gavin Bernard Horn, La Jolla, CA (US); John Edward Smee, San Diego, CA (US); Ravi Agarwal, San Diego, CA (US); Joseph Binamira Soriaga, San Diego, CA (US); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 16/681,219

(22) Filed: Nov. 12, 2019

(65) Prior Publication Data
US 2020/0084674 A1 Mar. 12, 2020

Related U.S. Application Data

(63) Continuation of application No. 15/268,279, filed on Sep. 16, 2016.
(Continued)

(51) Int. Cl.
*H04W 36/30* (2009.01)
*H04B 7/024* (2017.01)
(Continued)

(52) U.S. Cl.
CPC ............ *H04W 36/30* (2013.01); *H04B 7/024* (2013.01); *H04B 7/0639* (2013.01);
(Continued)

(58) Field of Classification Search
CPC ...... H04W 16/28; H04W 36/08; H04W 48/20; H04W 36/30; H04W 36/0005;
(Continued)

(56) References Cited

U.S. PATENT DOCUMENTS 8,634,844 B2 1/2014 Wennstrom et al.
8,804,656 B2 8/2014 Kitazoe
(Continued)

FOREIGN PATENT DOCUMENTS

CN 101466127 A 6/2009
CN 103024831 A 4/2013
(Continued)

OTHER PUBLICATIONS

"3GPP TR 25.814 V1.5.0 (May 2006)", 3rd Generation Partnership Project (3GPP), Mobile Competence Centre, 650, Route Des Lucioles, F-06921, Sophia-Antipolis Cedex, France, vol. 3GPP TR 25.814 V1.5.0 (May 2006), No. Shanghai, China, May 26, 2006, May 26, 2006 (May 26, 2006), XP050102001. pp. 1-125.
(Continued)

*Primary Examiner* — Hardikkumar D Patel
(74) *Attorney, Agent, or Firm* — Shumaker & Sieffer, P.A.

(57) ABSTRACT

Aspects of the present disclosure provide methods and apparatus for beam selection in uplink-based and downlink-based mobility scenarios, for example, for new radio (NR) systems which can improve handover reliability, reduce handover frequency, and improve power efficiency. Certain aspects provide a method for wireless communications by a user equipment (UE). The method generally includes transmitting an uplink reference signal with an indication of a preferred downlink beam and receiving a downlink transmission based, at least in part, on the uplink reference signal.

30 Claims, 18 Drawing Sheets

Related U.S. Application Data

(60) Provisional application No. 62/293,761, filed on Feb. 10, 2016.

(51) Int. Cl.
| | | |
|---|---|---|
| *H04W 48/00* | (2009.01) | |
| *H04W 76/10* | (2018.01) | |
| *H04B 7/06* | (2006.01) | |
| *H04L 5/00* | (2006.01) | |
| *H04W 36/00* | (2009.01) | |

(52) U.S. Cl.
CPC ......... *H04B 7/0695* (2013.01); *H04L 5/0048* (2013.01); *H04W 36/0005* (2013.01); *H04W 48/00* (2013.01); *H04W 76/10* (2018.02); *Y02D 30/70* (2020.08)

(58) Field of Classification Search
CPC .... H04W 48/00; H04W 76/10; H04B 7/0639; H04B 7/088; H04B 7/0469; H04B 7/0617; H04B 7/0695; H04B 7/0478; H04B 7/024; H04L 5/0048; Y02D 30/70
See application file for complete search history.

(56) References Cited

U.S. PATENT DOCUMENTS

| | | | |
|---|---|---|---|
| 9,264,961 | B1 | 2/2016 | Shah et al. |
| 9,451,536 | B2 | 9/2016 | Ryu et al. |
| 9,474,013 | B2 | 10/2016 | El et al. |
| 9,743,348 | B2 | 8/2017 | Kakishima et al. |
| 2007/0155390 | A1 | 7/2007 | Kodikara et al. |
| 2009/0175161 | A1* | 7/2009 | Yi .................. H04B 7/0623 370/328 |
| 2010/0067465 | A1* | 3/2010 | Miki .................. H04L 5/0037 370/329 |
| 2010/0103900 | A1* | 4/2010 | Yeh .................. H04B 7/0695 375/267 |
| 2010/0330995 | A1* | 12/2010 | Aoyama ........... H04W 72/0406 455/436 |
| 2013/0040684 | A1 | 2/2013 | Yu et al. |
| 2014/0010178 | A1* | 1/2014 | Yu .................. H04W 74/0833 370/329 |
| 2014/0348100 | A1 | 11/2014 | Ratasuk et al. |
| 2015/0003263 | A1 | 1/2015 | Senarath et al. |
| 2015/0365155 | A1 | 12/2015 | Subramanian et al. |
| 2016/0056871 | A1 | 2/2016 | Kakishima et al. |
| 2016/0087765 | A1 | 3/2016 | Guey et al. |
| 2016/0150435 | A1 | 5/2016 | Baek et al. |
| 2016/0190707 | A1* | 6/2016 | Park .................. H01Q 3/24 370/329 |
| 2016/0219625 | A1* | 7/2016 | Lee .................. H04W 4/029 |
| 2017/0019930 | A1 | 1/2017 | Lee et al. |
| 2017/0149480 | A1 | 5/2017 | Kakishima et al. |
| 2017/0230869 | A1 | 8/2017 | Kubota et al. |
| 2019/0013857 | A1* | 1/2019 | Zhang .................. H04W 74/04 |
| 2019/0014512 | A1* | 1/2019 | Rune .................. H04W 36/08 |

FOREIGN PATENT DOCUMENTS

| | | |
|---|---|---|
| CN | 103384386 A | 11/2013 |
| CN | 103716081 A | 4/2014 |
| CN | 103875190 A | 6/2014 |
| CN | 104067650 A | 9/2014 |
| CN | 104205911 A | 12/2014 |
| CN | 104734760 A | 6/2015 |
| EP | 3051711 A1 | 8/2016 |
| EP | 3122093 A1 | 1/2017 |
| WO | WO-03023995 A1 | 3/2003 |
| WO | 2008055169 A2 | 5/2008 |
| WO | 2013022292 A2 | 2/2013 |
| WO | WO-2015046895 A1 | 4/2015 |
| WO | WO-2015141071 A1 | 9/2015 |

OTHER PUBLICATIONS

International Search Report and Written Opinion—PCT/US2017/012555—ISA/EPO—dated Mar. 17, 2017.
Samsung: "Use of SRS received power for Inter-eNB CoMP," R1-140379, 3GPP TSG RAN WG1 Meeting #76, Prague, Czech Republic, Feb. 10-14, 2014, 5 pages.
European Search Report—EP19217959—Search Authority—Munich—dated Sep. 9, 2020.

\* cited by examiner

BEAM SELECTION FOR UPLINK AND DOWNLINK BASED MOBILITY

CROSS-REFERENCE TO RELATED APPLICATION & PRIORITY CLAIM

This application is a continuation of U.S. application Ser. No. 15/268,279, filed Sep. 16, 2016, which claims the benefit of and priority to U.S. Provisional Patent Application Ser. No. 62/293,761, filed Feb. 10, 2016, which are herein incorporated by reference in their entirety for all applicable purposes.

TECHNICAL FIELD

The present disclosure generally relates to wireless communications and, more particularly, to methods and apparatus for beam selection in uplink-based and downlink-based mobility scenarios, for example, for new radio (NR) systems which can improve handover reliability, reduce handover frequency, and improve power efficiency.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

A wireless communication network may include a number of base stations (BS) that can support communication for a number of user equipments (UEs). A UE may communicate with a BS via downlink and uplink. The downlink (or forward link) refers to the communication link from the BS to the UE, and the uplink (or reverse link) refers to the communication link from the UE to the BS. As will be described in more detail herein, a BS may be referred to as a Node B, gNB, access point (AP), radio head, transmission reception point (TRP), new radio (NR) BS, 5G Node B, etc.).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

Some wireless communication standards base user equipment handoff decisions based, at least in part, on downlink measurements. Future generation wireless communication may focus on user-centric networks. Accordingly, apparatus, methods, processing systems, and computer program products for new radio (NR) (new radio access technology or 5G technology) are desirable.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for beam selection in uplink-based and downlink-based mobility scenarios. For example, a downlink beam used for downlink signaling and/or a handover command (and selected transmission point) by a base station (BS) can be based on measurement of an uplink reference signal from the user equipment (UE) and/or based on an indication in the uplink reference signal of a preferred beam and/or transmission point.

Certain aspects of the present disclosure provide a method for wireless communication by a UE. The method generally includes transmitting an uplink reference signal with an indication of a preferred downlink beam and receiving a downlink transmission based, at least in part, on the uplink reference signal.

Certain aspects of the present disclosure provide an apparatus for wireless communication by a UE. The apparatus generally includes means for transmitting an uplink reference signal with an indication of a preferred downlink beam and means for receiving a downlink transmission based, at least in part, on the uplink reference signal.

Certain aspects of the present disclosure provide an apparatus for wireless communication by a UE. The apparatus generally includes at least one processor and a memory coupled with the at least one processor. The at least one processor is generally configured to transmit an uplink reference signal with an indication of a preferred downlink beam and receive a downlink transmission based, at least in part, on the uplink reference signal.

Certain aspects of the present disclosure provide a computer readable medium storing computer executable code for causing a UE to transmit an uplink reference signal with an indication of a preferred downlink beam and receive a downlink transmission based, at least in part, on the uplink reference signal.

Certain aspects of the present disclosure provide a method for wireless communication by a BS. The method generally includes receiving, from a UE, an uplink reference signal with an indication of a preferred downlink beam and transmitting a downlink transmission to the UE based, at least in part, on the uplink reference signal.

Certain aspects of the present disclosure provide an apparatus for wireless communication by a BS. The apparatus generally includes means for receiving, from a UE, an uplink reference signal with an indication of a preferred downlink beam and means for transmitting a downlink transmission to the UE based, at least in part, on the uplink reference signal.

Certain aspects of the present disclosure provide an apparatus for wireless communication by a BS. The apparatus generally includes at least one processor and a memory coupled with the at least one processor. The at least one processor is generally configured to receive, from a UE, an uplink reference signal with an indication of a preferred downlink beam and transmit a downlink transmission to the UE based, at least in part, on the uplink reference signal.

Certain aspects of the present disclosure provide a computer readable medium storing computer executable code for causing a BS to receive, from a UE, an uplink reference signal with an indication of a preferred downlink beam and transmit a downlink transmission to the UE based, at least in part, on the uplink reference signal.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
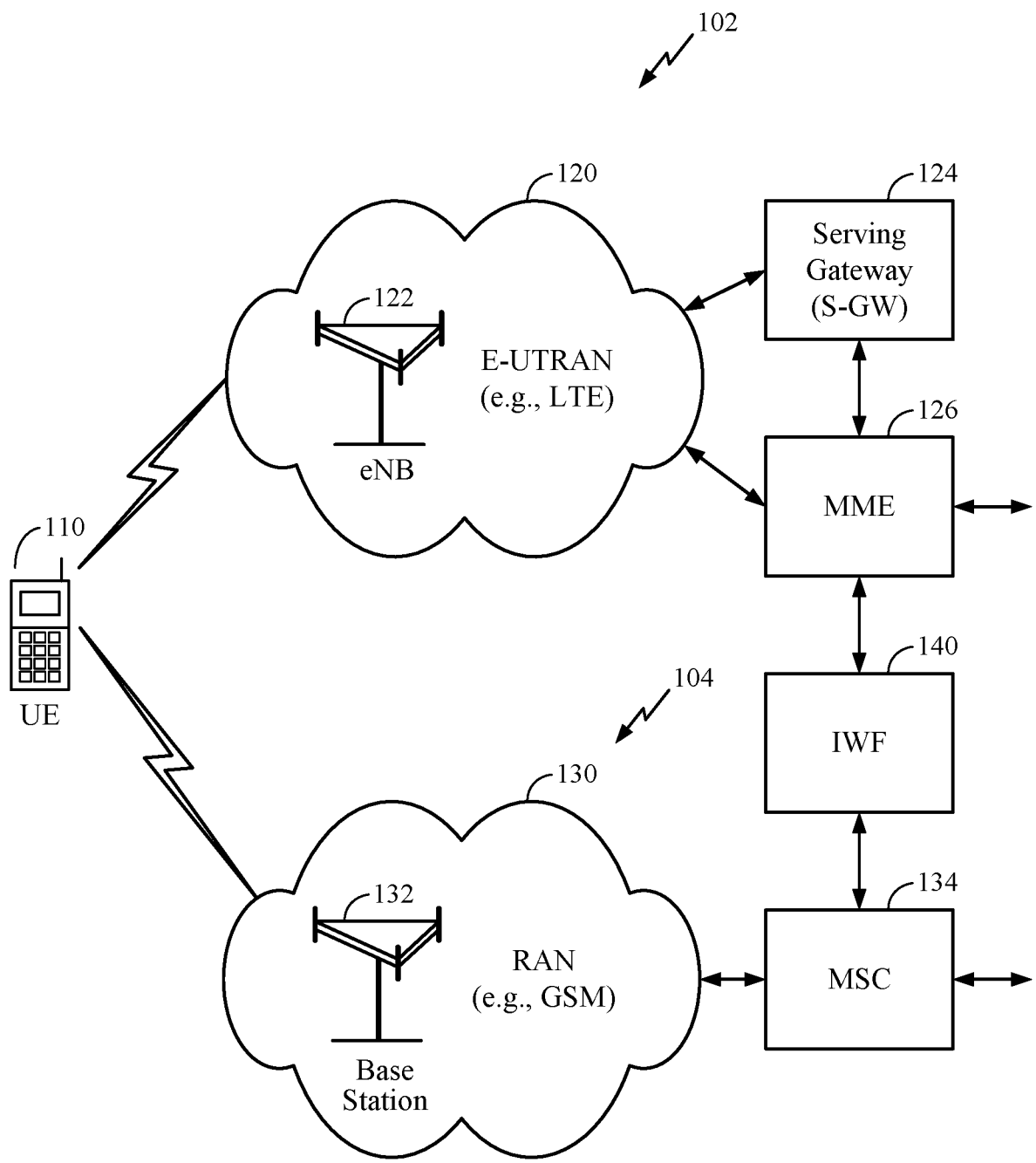
FIG. 1 illustrates an exemplary deployment in which multiple wireless networks have overlapping coverage, in accordance with certain aspects of the disclosure.

Aspects of the present disclosure provide apparatus, methods, processing systems, and computer program products for new radio (NR) (new radio access technology or 5G technology).

Aspects of the present disclosure provide techniques and apparatus for performing a straight-forward, quick, and resource-efficient handover procedure. As described herein, for uplink-based mobility, handovers may be performed based, at least in part, on uplink signal measurements taken by base stations (e.g., Node Bs (NBs), gNBs, access points (APs), smart radio heads (SRHs), transmission reception points (TRPs), NR BSs, 5G NBs, etc.), while for downlink-based mobility, handovers may be performed based on measurements taken by UEs. For example, 5G and other future communications systems may focus on creating a more user-centric network.

Aspects of the present disclosure provide a framework for (forward and backward) handover based on uplink and/or downlink measurements. In addition, 5G and other telecommunications may use beamformed transmissions. Aspects of the present disclosure also provide for beam selection techniques for both uplink-based and downlink-based mobility scenarios.

In downlink-based mobility, a UE may receive reference signals (e.g., measurement reference signals (MRS) from a BS and report measurements to the BS. The UE can also report a preferred beam and/or a preferred transmission point. The indication of the preferred beam and/or transmission point may be included in an uplink reference signal from the UE. Mobility decisions (e.g., for a handover command) at the BS can be based on measurement of the uplink reference signal and/or based on the indication in the uplink reference signal of the preferred beam and/or transmission point. The BS can also use the indication of the preferred beam for beamforming downlink signals to the UE.

In uplink-based mobility, a BS may make mobility decisions based on measurements of an uplink reference signal from a UE (e.g., without sending any MRS). The BS can also make the beam selection and/or transmission point selection.

In a hybrid mobility scheme, a BS can make mobility decisions and beam selection decisions based on reference signal parameters, for example, similar to the uplink-based mobility. In addition, the BS can also transmit MRSs and can refine the mobility decision and/or beam selection based on feedback from a UE (e.g., in the uplink reference signals).

Advantageously, a UE may receive a configuration for an uplink reference signal from a serving BS. A non-serving BS (e.g., a target BS) may receive a configuration for the uplink reference signal from the serving BS. In this manner, the UE may transmit the uplink reference signal which the target BS may receive. As described herein, either the source or target BS may transmit a handover command and/or connection reconfiguration message based, at least in part, on measurements of the received uplink reference signal.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Yes in some scenarios, the example can be preferred.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One non-limiting example of the processors is the Snapdragon processor. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media.

A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product and/or computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1x radio transmission technology (1xRTT), CDMA2000 1x, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs.

It is noted that while aspects may be described herein using terminology commonly associated with 3G and/or 4G wireless technologies, aspects of the present disclosure can be applied in other generation-based communication systems, such as 5G and later, including NR technologies.

An Example Wireless Communication System

FIG. 1 illustrates an example deployment in which aspects of the present disclosure may be implemented. For example, a user equipment (UE) 110 transmits an uplink reference signal to a base station (BS) 122 (e.g., a gNB, a transmission reception point (TRP), Node B (NB), 5G NB, access point (AP), new radio (NR) BS, etc.). The uplink reference signal can include an indication of a preferred downlink beam. The UE 110 can receive a downlink from the BS 122 based, at least in part, on the uplink reference signal. For downlink-based mobility, the UE 110 may receive measurement reference signals (MRS) transmitted with different beams from the BS 122. The UE 110 can select the preferred beam based on the MRS. The BS 122 can beamform the downlink signal to the UE using the preferred beam and/or the BS 122 can send a handover command to the UE 110 based, at least in part, on the uplink reference signal. For uplink-based mobility the UE 110 sends the uplink reference signal, without MRS from the BS 122, and the BS 122 can perform beam selection and/or handover decisions based on measurement of the uplink reference signal. In some cases a non-serving BS can receive the uplink reference signals and send a handover command to the UE 110.

FIG. 1 shows an exemplary deployment in which multiple wireless networks have overlapping coverage. The system illustrated in FIG. 1 may include, for example, an evolved universal terrestrial radio access network (E-UTRAN) 120 may support long term evolution (LTE) and a GMS network 130. According to aspects, the system illustrated in FIG. 1 may include one or more other networks, such as a NR network. The radio access network may include a number of s 122 BSs and other network entities that can support wireless communication for UEs. In some cases, a NR network may include a central unit (CU) and distributed units (DUs).

Each BS may provide communication coverage for a particular geographic area. The term "cell" can refer to a coverage area of a BS or BS subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

In NR systems, the term "cell" and gNB, Node B, 5G NB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1×CSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A UE 110 may be stationary or mobile and may also be referred to as a mobile station, a terminal, an access terminal, a subscriber unit, a station, etc. A UE may also be referred to as an access terminal, a terminal, a mobile station, a subscriber unit, a station, etc. A UE may be a Customer Premises Equipment (CPE), a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, mammal implant device, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, military firearm or communication device, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified a standard (e.g., LTE). UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1×RTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

In some examples, access to the air interface may be scheduled. A scheduling entity (e.g., a base station) can allocate resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
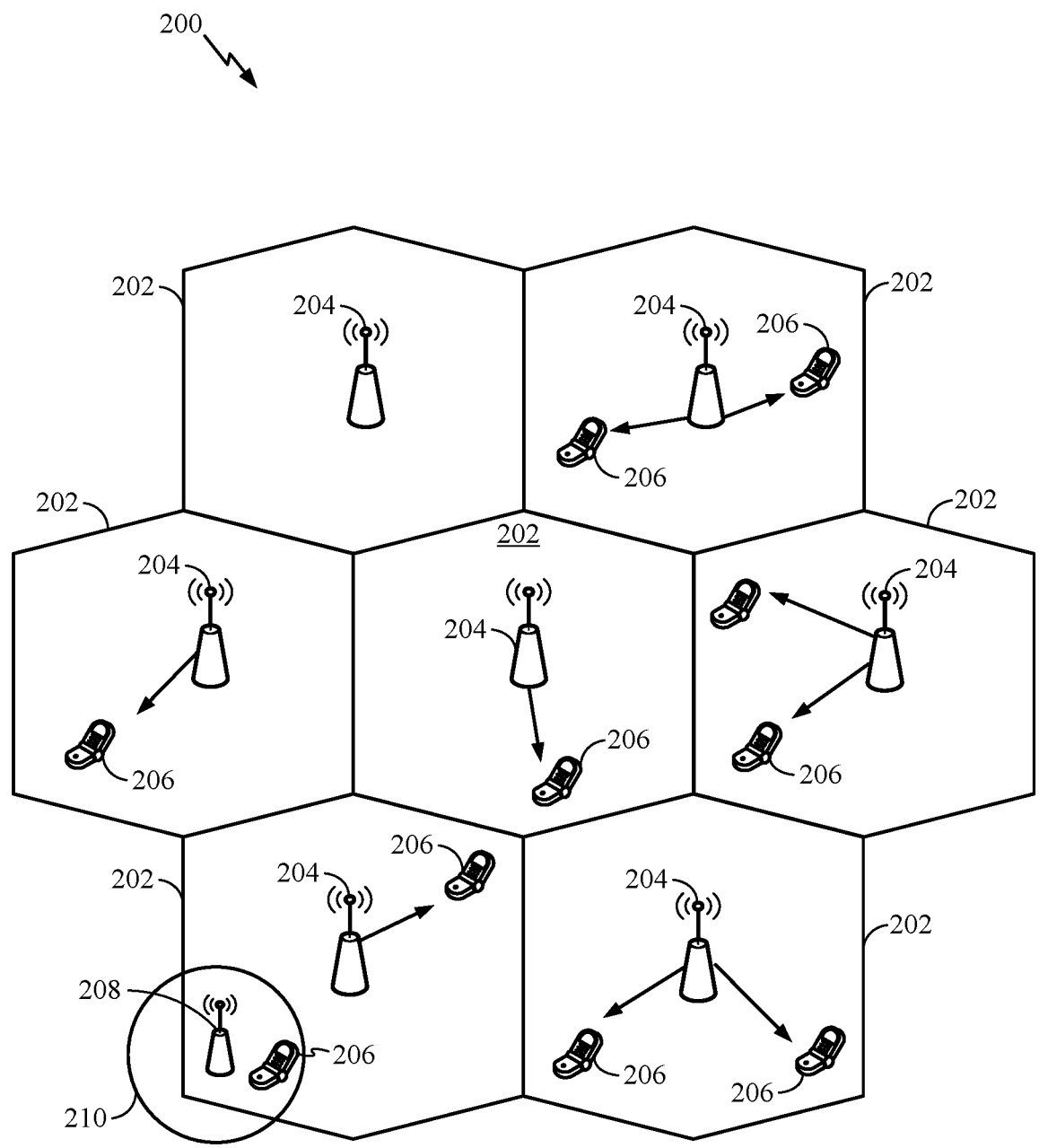
FIG. 2 is a diagram illustrating an example of an access network, in accordance with certain aspects of the disclosure.

FIG. 2 is a diagram illustrating an example of an access network 200. UE 206 may transmit an uplink reference signal which may be received by both a serving and non-serving BSs 204, 208. Serving and non-serving BSs 204, 208 may receive the uplink reference signal and either of the BSs may transmit a handover command to the UE based, at least in part, on the uplink reference signal. The uplink reference signal can include an indication of a preferred downlink beam. For downlink-based mobility, the UE 206 may receive measurement reference signals (MRS) transmitted with different beams from the BS 204. The UE 206 can select the preferred beam based on the MRS. The BS 204 can beamform the downlink signal to the UE using the preferred beam and/or the BS 204 can send a handover command to the UE 206 based, at least in part, on the uplink reference signal. For uplink-based mobility the UE 206 sends the uplink reference signal, without MRS from the BS 204, and the BS 204 can perform beam selection and/or handover decisions based on measurement of the uplink reference signal. In some cases a non-serving BS 208 can receive the uplink reference signals and send a handover command to the UE 206.

In FIG. 2, the access network 200 is divided into a number of cellular regions (cells) 202. One or more lower power class BS 208 may have cellular regions 210 that overlap with one or more of the cells 202. A lower power class BS 208 may be referred to as a remote radio head (RRH). The lower power class BS 208 may be a femto cell (e.g., home NB (HNB)), pico cell, or micro cell. The macro NBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The BSs 204 are responsible for all radio related functions including radio bearer control, admission control, mobility control, scheduling, security, and connectivity to the serving gateway 124.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application, the overall design constraints imposed on the system, or desired operating parameters.

The BS 204 may have multiple antennas supporting MIMO technology (e.g., massive MIMO). The use of MIMO technology enables the BS 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the BS 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
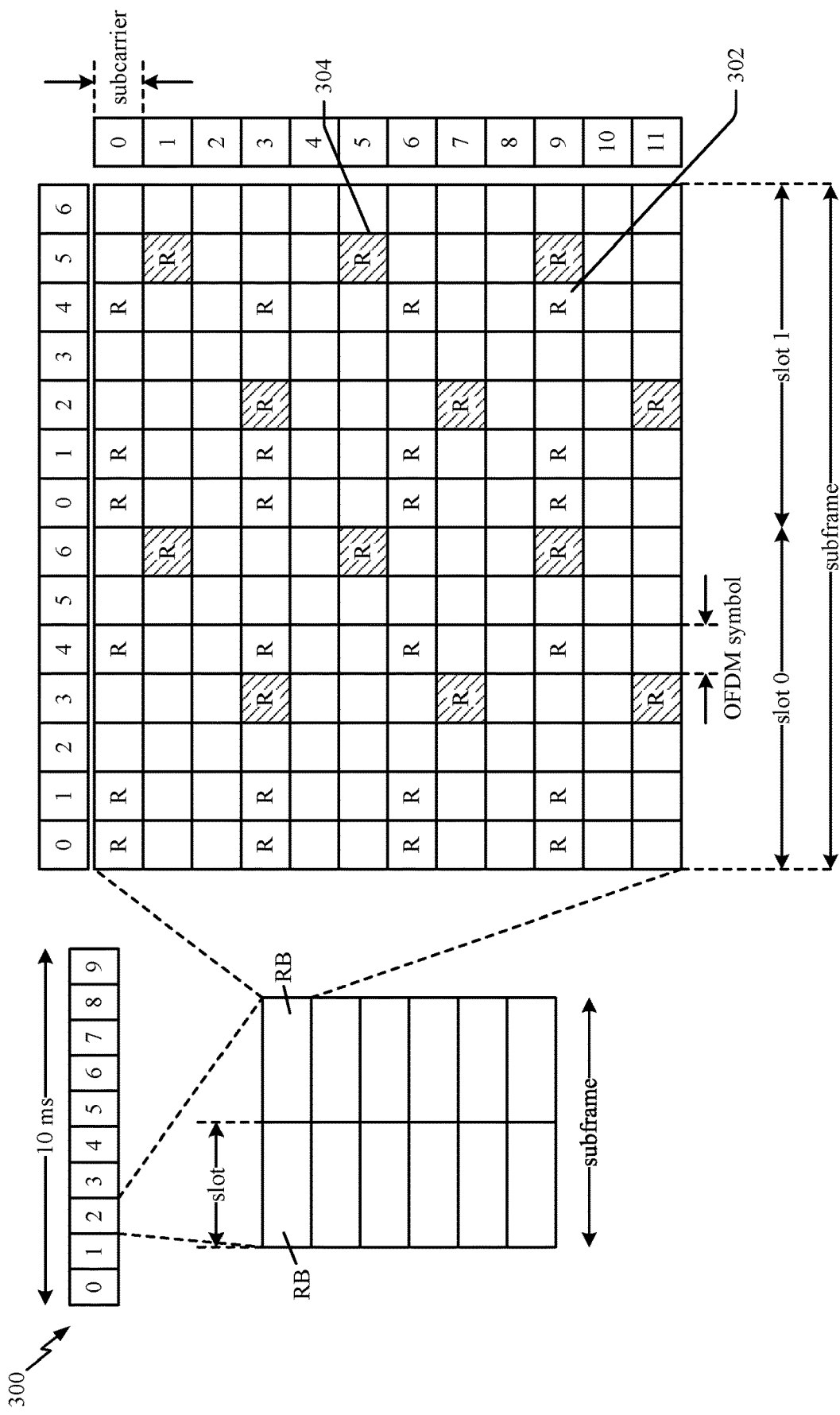
FIG. 3 is a diagram illustrating an example of a DL frame structure in a telecommunications system, in accordance with certain aspects of the disclosure.

FIG. 3 is a diagram 300 illustrating an example of a DL frame structure in a telecommunications system (e.g., LTE). A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, a NB may send a primary synchronization signal (PSS) and a secondary synchronization signal (SSS) for each cell in the BS. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The NB may send a Physical Broadcast Channel (PBCH) in symbol periods 0 to 3 in slot 1 of subframe 0. The PBCH may carry certain system information.

The NB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The NB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The NB may send a Physical Downlink Shared Channel (PDSCH) in the remaining symbol periods of each subframe. The PDSCH may carry data for UEs scheduled for data transmission on the downlink.

The NB may send the PSS, SSS, and PBCH in the center 1.08 MHz of the system bandwidth used by the NB. The NB may send the PCFICH and PHICH across the entire system bandwidth in each symbol period in which these channels are sent. The NB may send the PDCCH to groups of UEs in certain portions of the system bandwidth. The NB may send the PDSCH to specific UEs in specific portions of the system bandwidth. The NB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A NB may send the PDCCH to the UE in any of the combinations that the UE will search.

In other systems (e.g., such NR or 5G systems), a Node B may transmit these or other signals in these locations or in different locations of the subframe.

Figure 4:
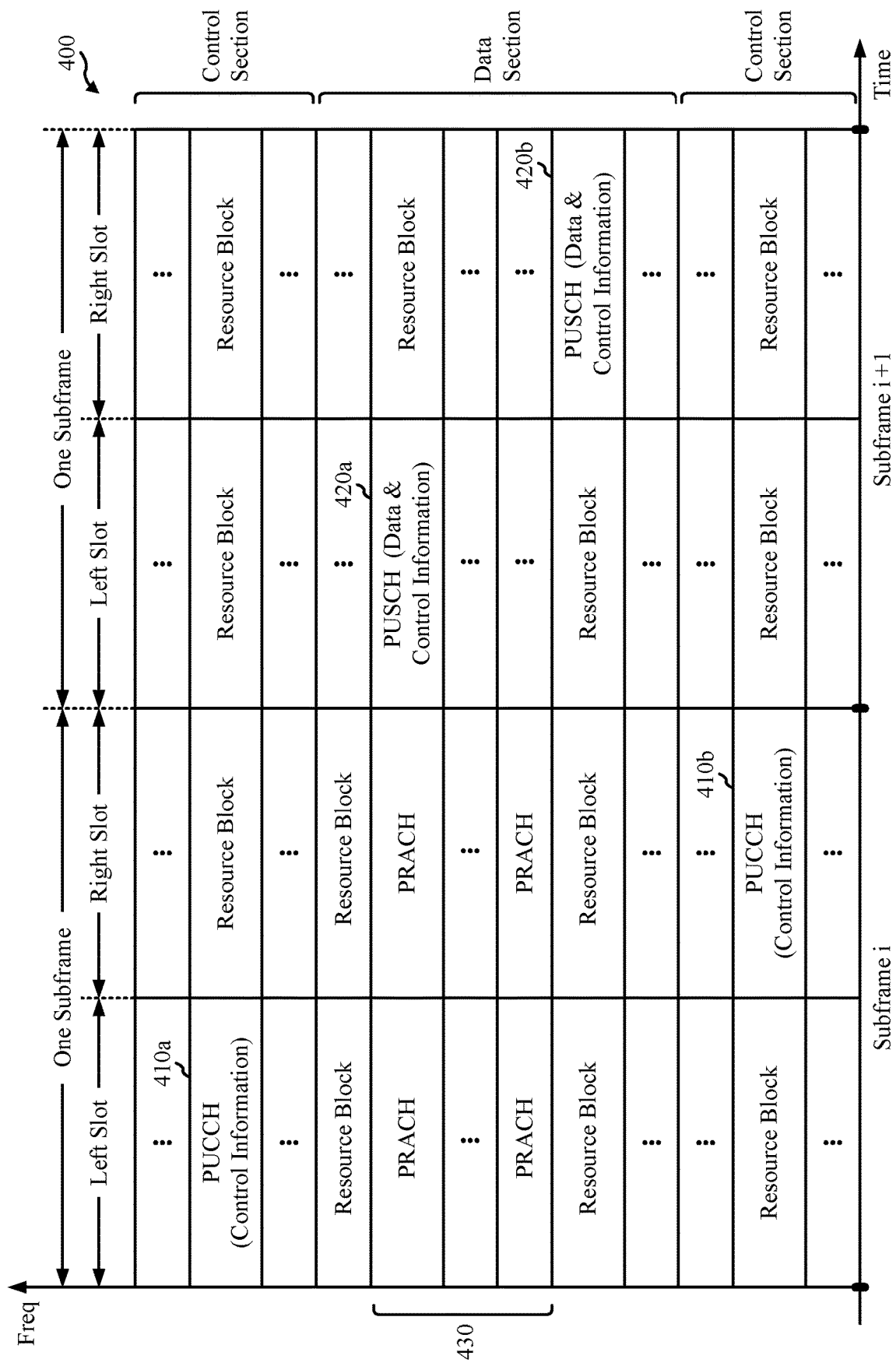
FIG. 4 is a diagram illustrating an example of an UL frame structure in a telecommunications system, in accordance with certain aspects of the disclosure.

FIG. 4 is a diagram 400 illustrating an example of an UL frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to a BS. The UE may also be assigned resource blocks 420a, 420b in the data section to transmit data to the BS. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

As will described in more detail below, in other systems (e.g., NR or 5G systems), different uplink and/or downlink frame structures may be used.

Figure 5:
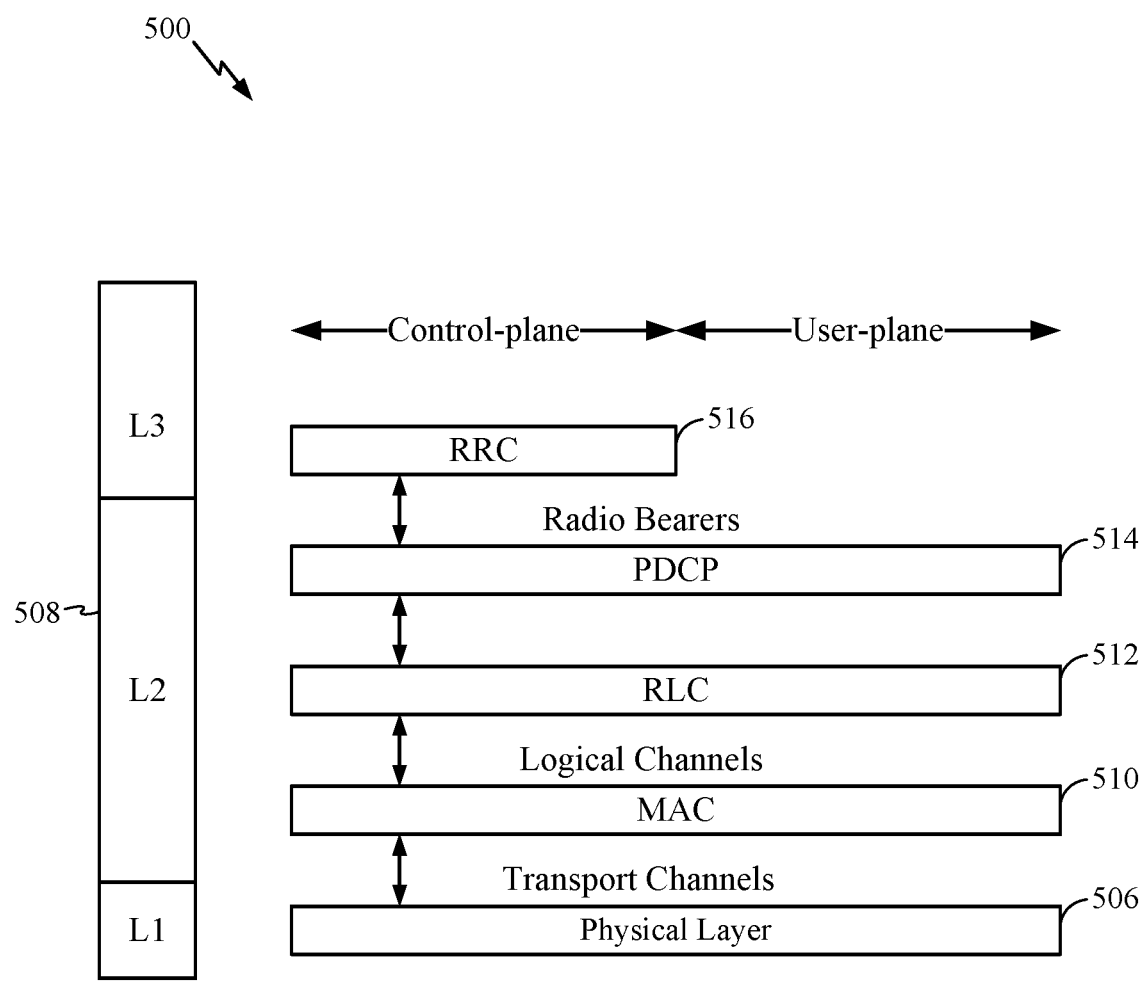
FIG. 5 is a diagram illustrating an example of radio protocol architecture for the user and control plane, in accordance with certain aspects of the disclosure.

FIG. 5 is a diagram 500 illustrating an example of a radio protocol architecture for the user and control planes in a telecommunications system (e.g., LTE). The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

Figure 6:
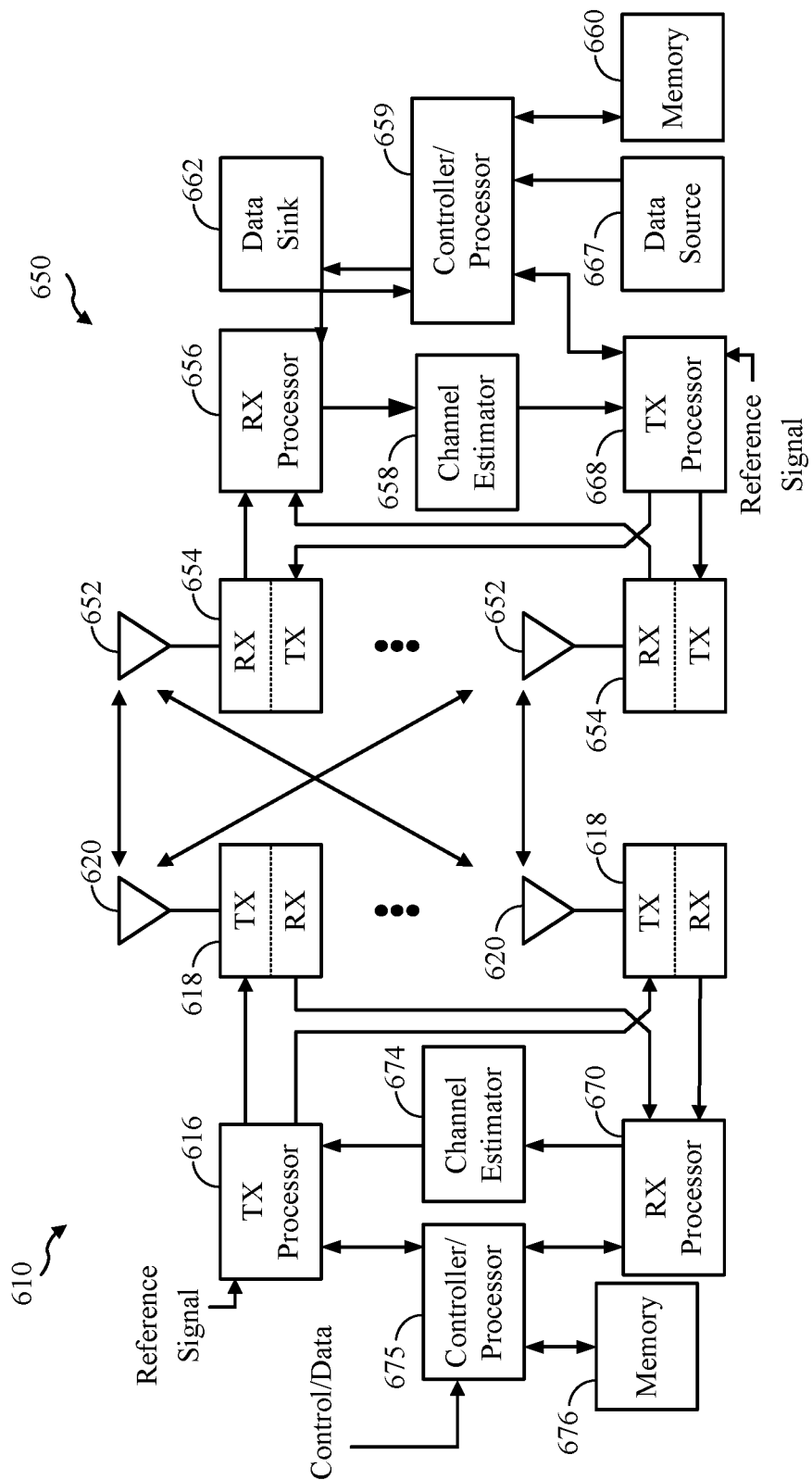
FIG. 6 is a diagram illustrating an example of a base station (BS) and user equipment (UE) in an access network, in accordance with certain aspects of the disclosure.

FIG. 6 is a block diagram of a BS 610 in communication with a UE 650 in an access network in accordance with aspects of the present disclosure. The BSs of FIG. 1 and FIG. 2 may include one or more components of BS 610 illustrated in FIG. 6. Similarly, the UEs illustrated in FIGS. 1 and 2 may include one or more components of UE 650 as illustrated in FIG. 6. One or more components of the UE 650 and BS 610 may be configured to perform the operations described herein.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the BS 610. These soft decisions may be based on channel estimates computed by the channel estimator 658. The soft decisions are then decoded and deinterleaved to recover the data and control signals that were originally transmitted by the BS 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the BS 610, the controller/processor 659 implements the L2 layer for the user plane and the control plane by providing header compression, ciphering, packet segmentation and reordering, and multiplexing between logical and transport channels based on radio resource allocations by the BS 610. The controller/processor 659 is also responsible for HARQ operations, retransmission of lost packets, and signaling to the BS 610.

Channel estimates derived by a channel estimator 658 from a reference signal or feedback transmitted by the BS 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the BS 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The controller/processor 659 may direct the operation at the UE 650. The controller/processor 659 and/or other processors, components, and/or modules at the UE 650 may perform or direct operations performed by the UE as described herein. The controller/processor 675 may direct the operations at the BS 610. The controller/processor 675 and/or other processors, components, and/or modules at the BS 610 may perform or direct operations performed by the BS as described herein. In aspects, one or more of any of the components shown in FIG. 6 may be employed to perform example operations 1300, 1400, 1700, and 1800 shown in FIGS. 13, 14, 17, and 18, respectively, and can also perform other UE and BS operations for the techniques described herein.

For example, one or more of the antenna 620, transceiver 618, controller/processor, and memory 676 may be configured to receive an uplink reference signal from a UE, measure the uplink reference signal, and transmit a handover command, as described herein. One or more of the antenna 652, transceiver 654, controller/processor 659, and memory 660 may be configured to transmit an uplink reference signal and receive a beamformed downlink signal or handover command, as described herein.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
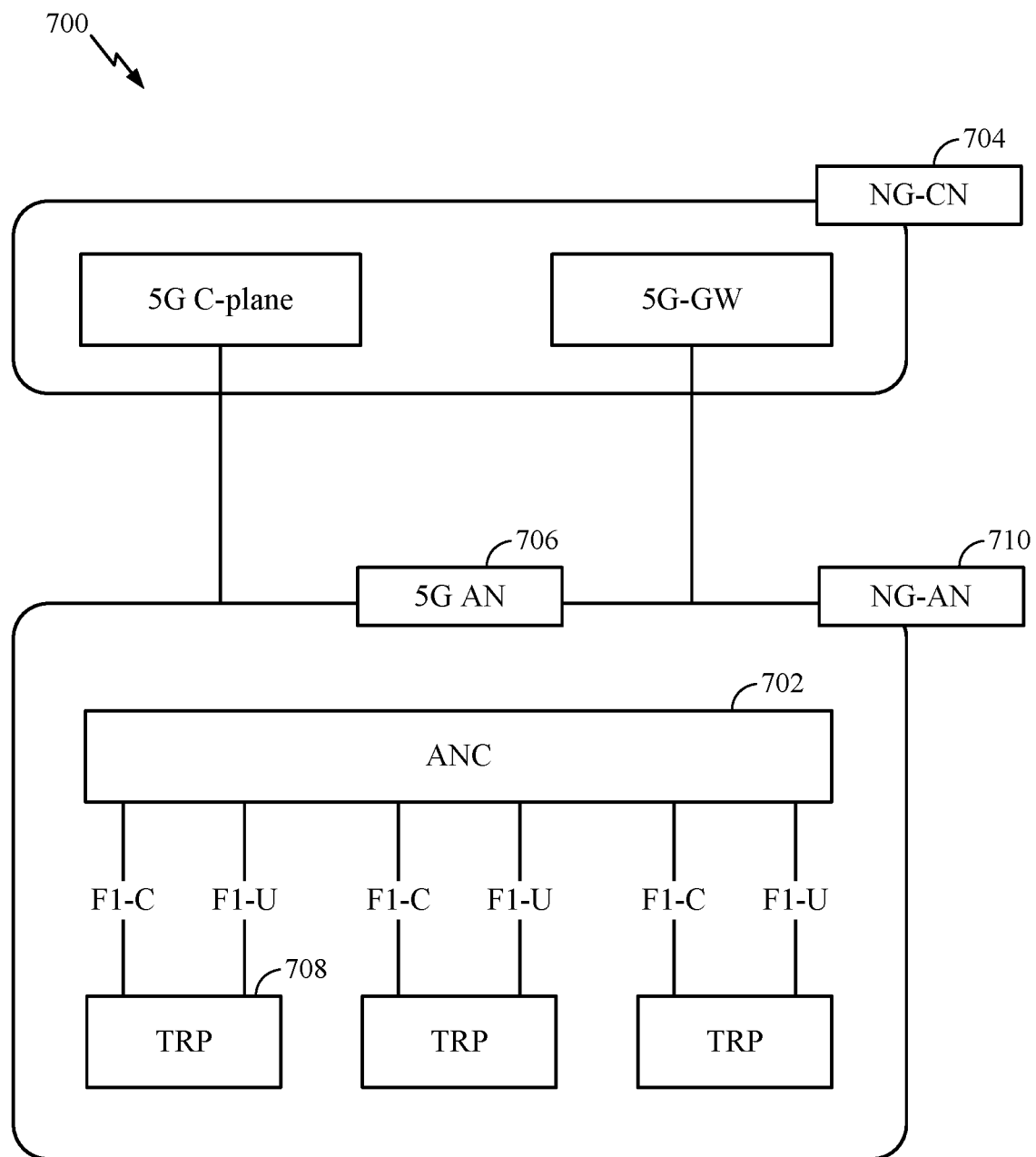
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 708).

Figure 8:
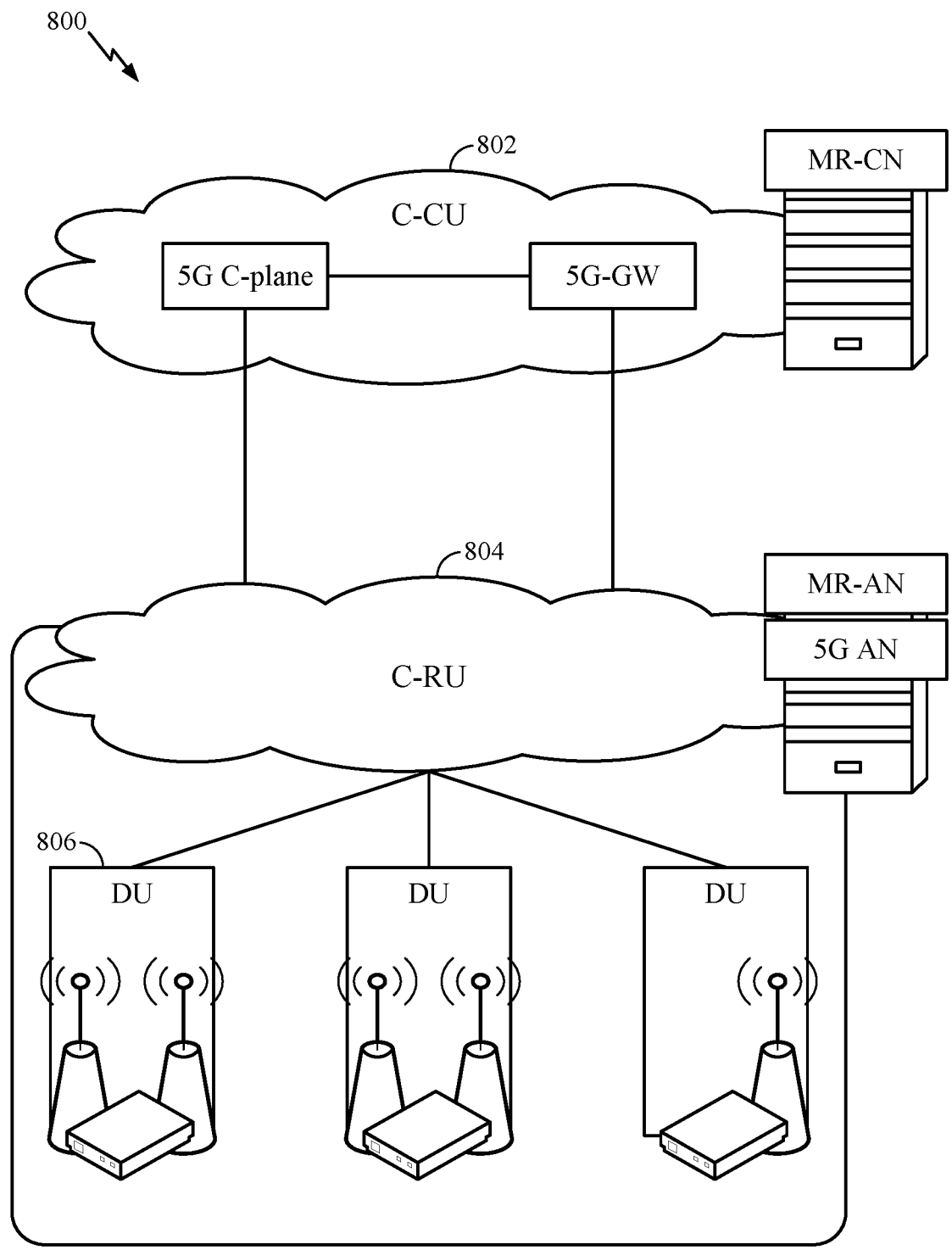
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 9:
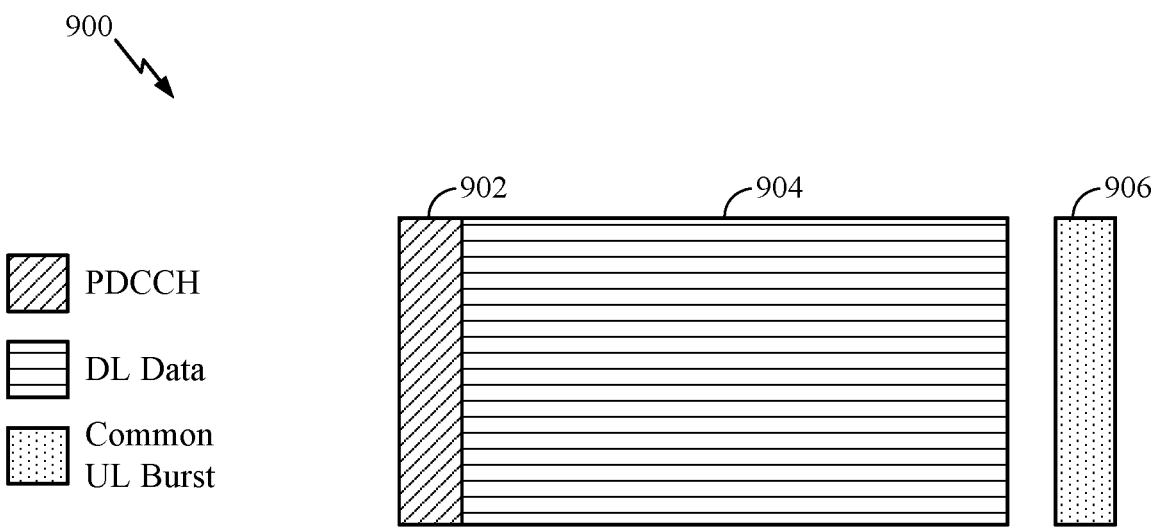
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
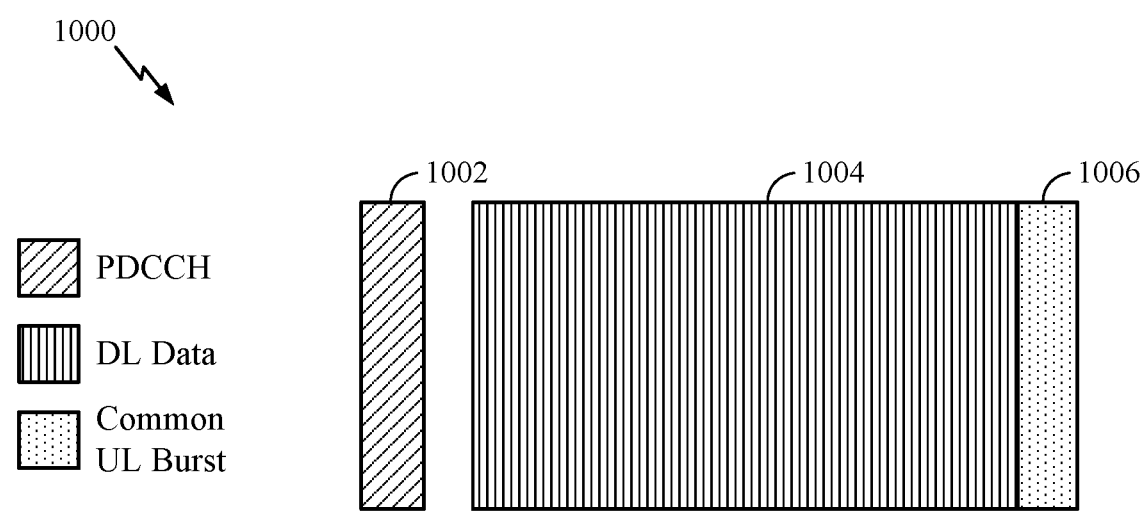
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical UL shared channel (PUSCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum)

Example Downlink-Based Mobility Procedure

Figure 11:
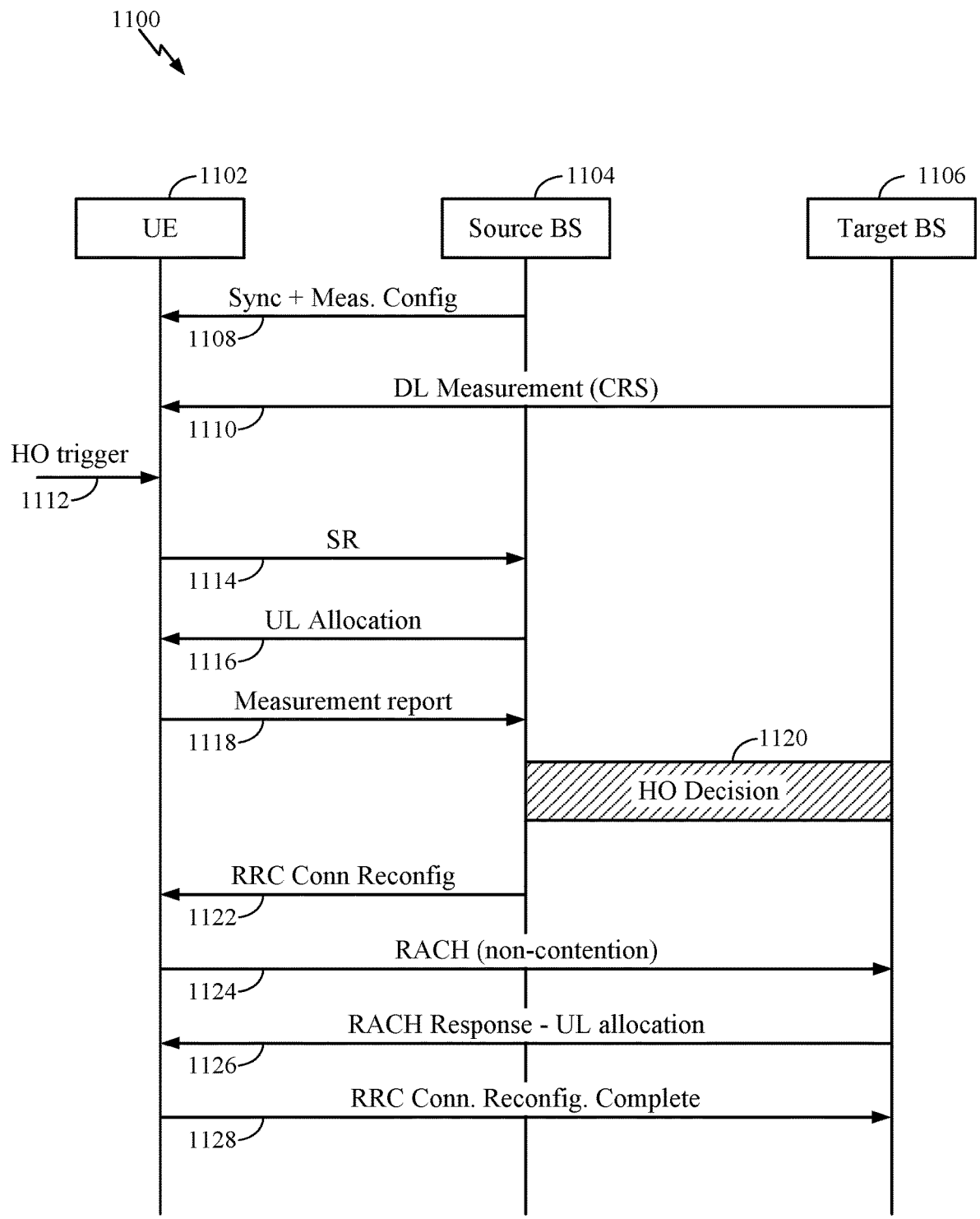
FIG. 11 is a call-flow diagram illustrating an example downlink-based handover procedure, in accordance with certain aspects of the disclosure.

FIG. 11 illustrates an example call-flow diagram illustrating operations 1100 which may be performed in a handover procedure, according to certain wireless technologies. For example, in a 4G communication system, a UE 1102 synchronizes to a source BS 1104. At 1108, the source BS 1104 provides (e.g., transmits) a measurement configuration to the UE 1102. The measurement configuration may include one or more of the cells on which the UE 1102 may perform measurements, criteria used by the UE 1102 to trigger a transmission of a measurement report, and/or the measurements that the UE 1102 may perform.

At 710, the UE 1102 measures downlink signals transmitted by a target BS 1106 according to the received measurement configuration. For example, the UE 1102 may measure cell specific reference signals (CRS) transmitted by the target BS 706 in an effort to determine downlink channel quality. A handover trigger 1112 occurs based, at least in part, on the UE downlink signal measurements. For example, the handover trigger at 1112 may occur upon determining the downlink channel quality associated with the target BS 1106 exceeds the downlink channel quality associated with the source BS 1104.

In response to the handover trigger, at 1114, the UE 1102 transmits a status request (SR) message to the source BS 1104. The source BS 114 transmits an uplink allocation at 1116 to the UE 1102. The UE 1102 transmits a measurement report at 1118 using the received uplink allocation. At 1120, the source BS 1104 and target BS 1106 exchange information and make a handover decision regarding the UE 1102 based on the received measurement report. Accordingly, the handover decision may be based, at least in part, on downlink signal measurements taken by the UE 1102.

Based on the handover decision at 1120, the source BS 1104 transmits, at 1122, a radio resource control (RRC) connection reconfiguration message, indicating a request to modify an RRC connection and perform a handover to the target BS 1106. After receiving the handover command, the UE 1102, at 1124, performs a random access procedure with the target BS 1106. At 1126, the UE 1102 receives a random access response and uplink allocation from the target BS 1106. At 1128, the UE 1102 transmits an RRC connection reconfiguration complete message to the target BS 1106, confirming completion of the RRC connection reconfiguration.

Example Uplink-Based Mobility

As described above, handover decisions may be based on measurements of received downlink signals (e.g., downlink-based mobility). In an effort to perform handovers in a user-centric environment, it may be desirable to perform handovers based, at least in part, on uplink signal measurements taken by BSs. For example, NR/5G and other future communication systems may focus on creating a more user-centric network. User-centric networking may refer the use of user devices in autonomic and self-organizing wireless community networks, for example, created and controlled by the user.

Figure 12:
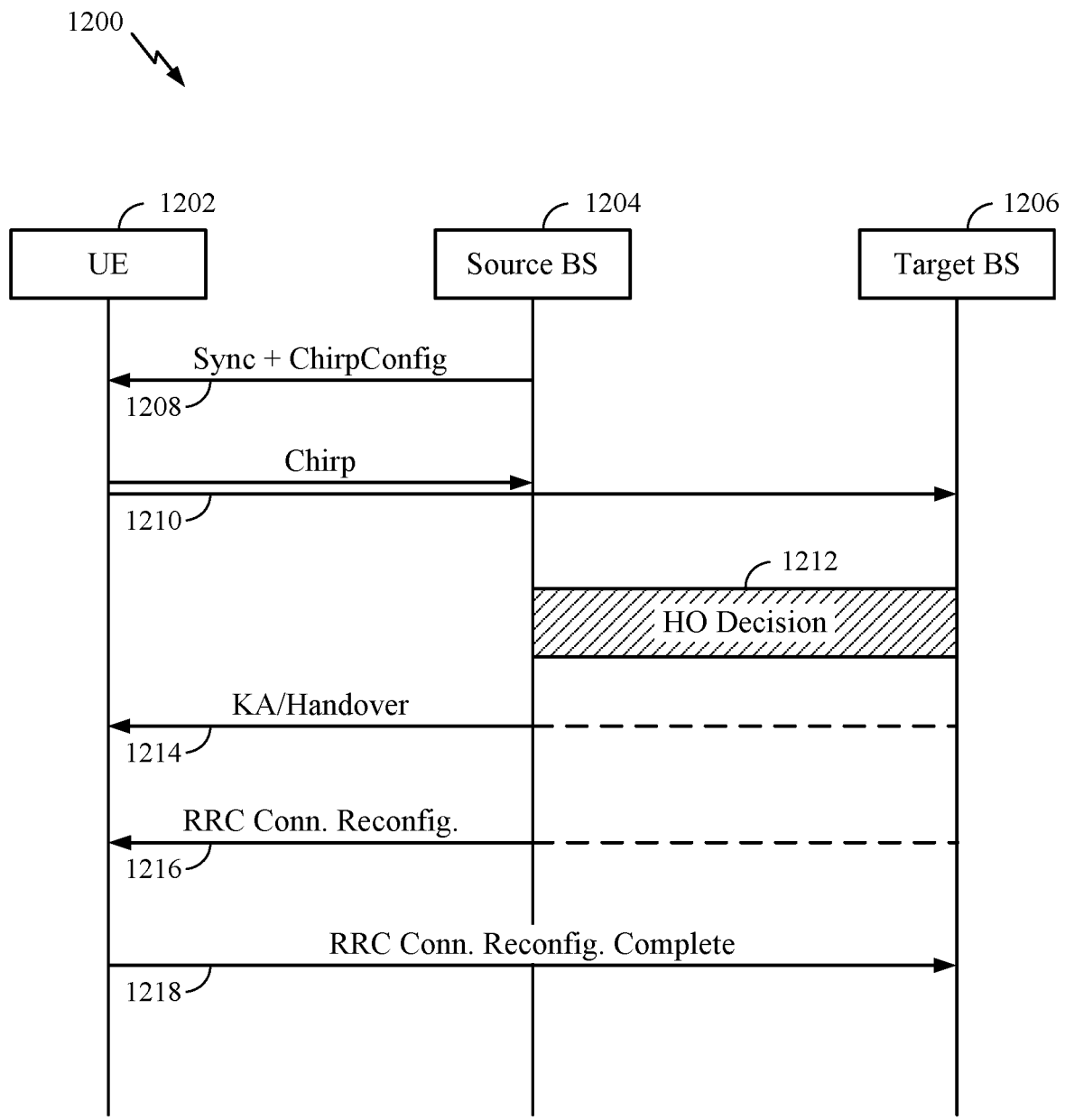
FIG. 12 is a call-flow diagram illustrating an example uplink-based handover procedure, in accordance with certain aspects of the disclosure.

FIG. 12 is an example call-flow diagram illustrating operations 1200 which may be performed in a handover procedure, according to certain aspects of the present disclosure. At 1208, the source BS 1204 provides the UE 1202 with a configuration for an uplink reference signal to be transmitted by the UE 1202. This uplink reference signal, which may be referred to as a "chirp", may be advantageously received by both the source BS 1204 and one or more target BS 1206.

Although not shown in FIG. 12, the source BS 1204 and target BS 1206 may exchange information regarding the UE 1202 (e.g., via an X2 interface or backhaul connection), in an effort to facilitate the target BS 1206 detecting the uplink reference signal. For example, the target BS 1206 may receive a UE ID and/or reference signal configuration (e.g., chirp configuration) from the source BS 1204. In this manner, the target BS 1206 may be aware of the UE 1202 and may detect the uplink reference signal.

According to certain aspects, though not illustrated in FIG. 12, power control commands may be received by the UE 1202 for the uplink reference signal. For example, the source BS 1204 may transmit power control commands for the uplink reference signal in an effort for the target BS 1206 to receive the uplink reference signal.

According to certain aspects, the uplink reference signal may include a cyclic prefix (CP) configuration which may assist the target BS 1206 in detecting the chirp signal. Since uplink signals may be time-aligned with the source BS 1204, allowing a special CP configuration for the chirp signal may increase chances of reception by the target BS.

As compared to the handover procedure illustrated in FIG. 11, aspects described herein allow a handover decision to be made based on uplink reference signal measurements taken by the source BS 1204 and the target BS 1206. In this manner, as will be described with reference to FIG. 12, the UE 1202 receives a "keep alive" (KA)/handover command or a RRC connection reconfiguration message from the target BS 1206, as opposed to receiving the RRC connection reconfiguration message from the source BS 1204.

At 1210, the UE 1202 transmits an uplink reference signal, in accordance with the received chirp configuration, capable of being received by both the source BS 1204 and the target BS 1206. The source BS 1204 and the target BS 1206 measure the received uplink reference signal. At 1212, the source BS 1204 and the target BS 1206 may collectively decide to handover the UE 1202 from the source BS 1204 to the target BS 1206 based on uplink measurements of the chirp signal.

At 1214, either the source BS 1204 or the target BS 1206 may transmit a KA/handover command to the UE 1202, indicating a handover is to be performed. According to certain aspects, the KA/handover message may be scrambled by a UE identifier, as opposed to, for example, a cell identification. Scrambling by the UE identifier enables the target BS 1206 to transmit the KA/handover command at 1214. The KA/handover message may include the target BS's cell identification and timing advance (TA). According to certain aspects, the target BS 1206 may determine the TA based on the received uplink reference signal. Additionally, the KA/handover command 1214 may include an uplink/downlink allocation for the target BS 1206 and UE 1202. In this manner, the UE 1202 may begin communicating with the target BS 1206 after receiving the KA/handover command.

At 1216, at least one of the source BS 1204 or the target BS 1206 may transmit an RRC connection reconfiguration message indicating a request to modify an RRC connection. For example, the BS which initiates the handover may transmit the RRC connection reconfiguration message. At 1218, the UE 1202 transmits an RRC connection reconfiguration complete message to the target BS 1206.

As described above, an uplink reference signal transmitted by the UE 1202 allows the source BS 1204 and one or more potential target BS 1206 to measure uplink signal strength. The uplink reference signal may be an RRC dedicated uplink reference signal. According to aspects, the uplink reference signal may be an uplink wide-band signal.

Figure 13:
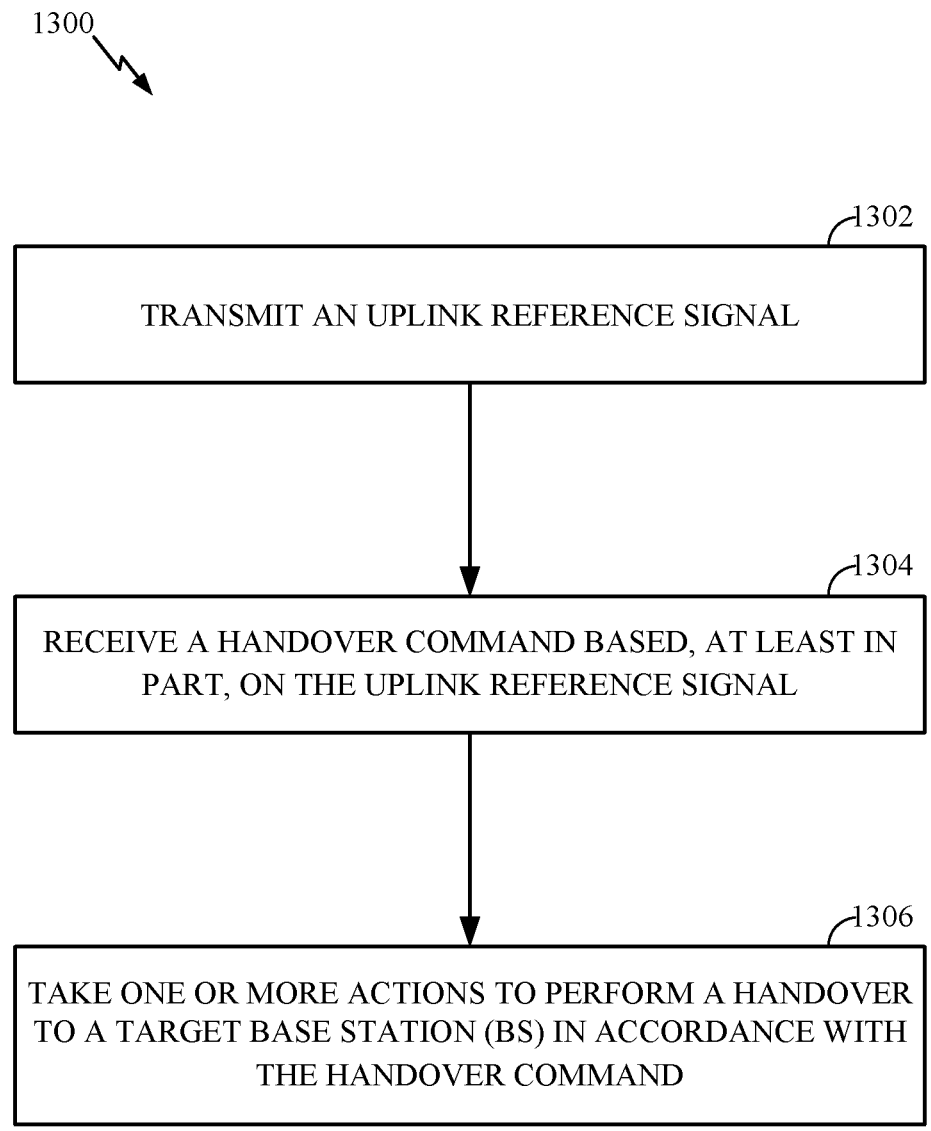
FIG. 13 is a call flow illustrating example operations, performed by a UE, for uplink-based mobility, in accordance with certain aspects of the disclosure.

FIG. 13 illustrates example operations 1300 which may be performed by a UE (e.g., UE 110), according to aspects of the present disclosure. The operations may be performed by one or more components of UE 650 illustrated in FIG. 6. For example, one or more of the antenna 652, transceiver 654, controller/processor 659, and memory 660 may be configured to perform the operations illustrated in FIG. 13.

At 1302, the UE may be configured to transmit an uplink reference signal. At 1304, the UE may be configured to receive a handover command based, at least in part, on the uplink reference signal. At 1306, the UE may be configured to take one or more actions to perform a handover to a target BS in accordance with the handover command.

As described above, the UE may receive a configuration for the uplink reference signal from a serving BS, wherein the configuration allows the target BS to receive the uplink reference signal. Advantageously, the handover command may be received from a serving BS or a target BS. The handover command may be scrambled by a UE identifier (as opposed to a cell ID). Similar to the handover command, a connection reconfiguration message may be received from one of the serving BS or the target B S.

The handover command may include one or more of a cell identification associated with a target BS, a timing advance (TA) associated with the target BS, or an uplink/downlink resource allocation for communicating with the target BS.

The UE may receive a power control command from the serving BS for the uplink reference signal and may transmit the uplink reference signal in accordance with received power control command.

As described above, a cyclic prefix (CP) of the uplink reference signal may be longer than a CP is longer than a CP of another type of reference signal, in an effort to assist the target BS to detect the uplink reference signal.

Figure 14:
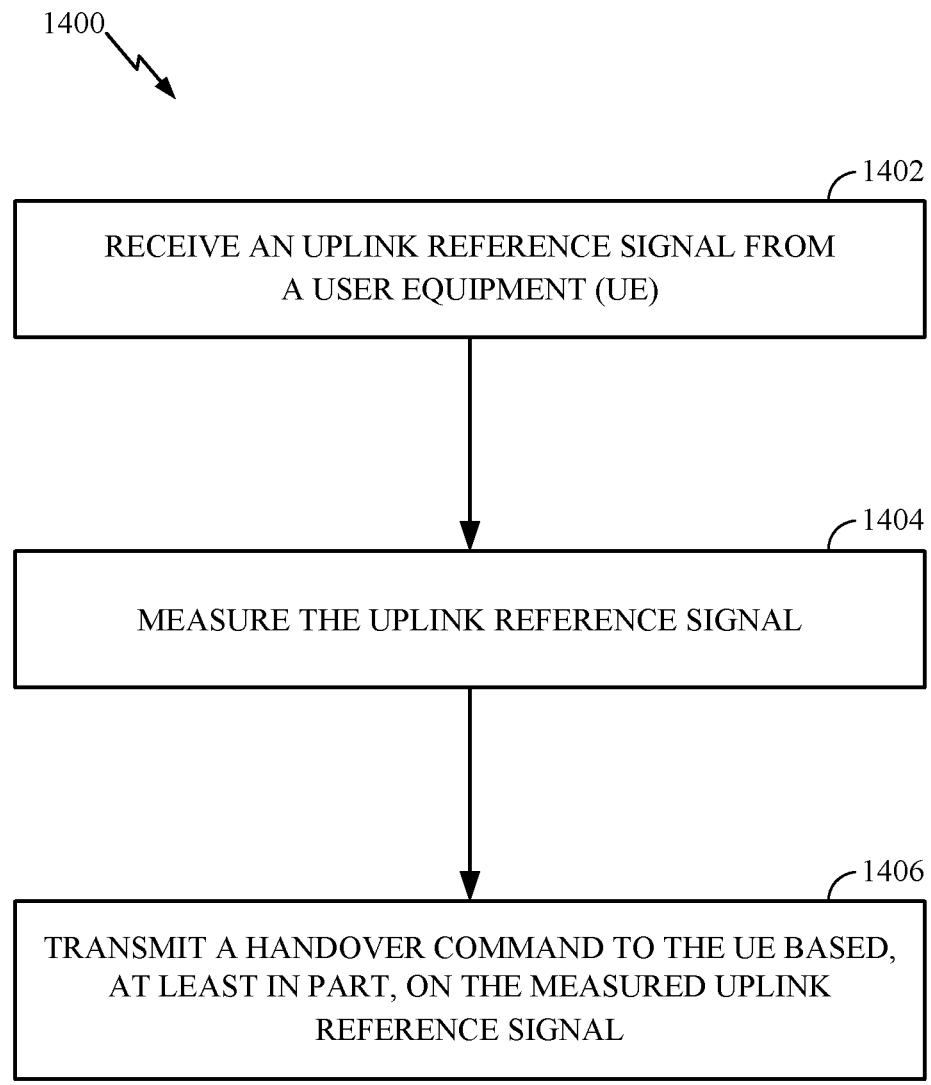
FIG. 14 is a call flow illustrating example operations, performed by a source or target BS, for uplink-based mobility, in accordance with certain aspects of the disclosure.

FIG. 14 illustrates example operations 1400 which may be performed by a first BS, such as a BS serving a UE or a non-serving BS, according to aspects of the present disclosure. The operations may be performed by one or more components of BS 610 illustrated in FIG. 6. For example, one or more of the antenna 620, transceiver 618, controller/processor 675, and memory 676 may be configured to perform the operations 1400.

At 1402, the BS may receive an uplink reference signal from a user equipment (UE). At 1404, the BS may measure the uplink reference signal. At 1406, the BS may transmit a handover command to the UE based, at least in part, on the measured uplink reference signal.

The serving BS may transmit, to the UE, a configuration for the uplink reference signal, wherein the configuration allows a second, non-serving BS to receive the uplink reference signal.

A non-serving BS (e.g., a target BS) may receive, from the serving BS, a configuration for the uplink reference signal, wherein the configuration allows the non-serving BS to receive the uplink reference signal.

As described above, either the serving or non-serving BS may transmit a connection reconfiguration message to the UE.

Aspects described herein allow support for forward and backward handover using an uplink reference signal. For example, a forward handover may refer to a handover where a UE receives the handover command directly from a target BS. According to one example of a forward handover, with reference to FIG. 1, a UE 110 communicating with a source BS 132 may handover to a target BS 122 without the source BS 132 first preparing the target BS 122 for the handover. A backward handover may refer to a handover wherein the UE receives a handover command from the serving BS. By using an uplink signal which may be received by a serving and non-serving BS, aspects of the present disclosure allow handover decisions to be made using measurement of the uplink reference signal.

Example Beam Selection for Uplink and Downlink Based Mobility

In some cases, advanced radio-access technology (RAT) networks (e.g., 5G systems and beyond) may be deployed with multiple base stations (BSs) (e.g., transmission reception Points (TRPs), gNBs, new radio (NR) BSs, access points (APs), Node Bs (NBs), 5G NBs, etc.), for example, such as BS 122. In such cases, data may be beamformed via the BSs.

In such advanced RAT networks, there may be two general types of mobility procedures: uplink-based and downlink-based mobility procedures. For the uplink based case, a UE (e.g., UE 110) may send an uplink reference signal (e.g., such as the UE chirp, described herein and also referred to as an uplink synchronization signal (USS), uplink mobility indication channel (UMICH), or uplink reference signal (URS)) and the network (e.g., BS) may measure the uplink reference signals and make a mobility decision based on the measurement. On the other hand, for the downlink-based case, the network sends downlink reference signals (e.g., measurement reference signals (MRS)) and UE measures the downlink reference signals and sends a measurement report message including the measured results of the downlink reference signals when certain reporting criteria are met.

Aspects of the present disclosure provide mechanisms for beam based wireless communication systems that may help efficiently perform a beam selection with UL based techniques, DL based techniques, or a "hybrid" combination of both UL and DL based techniques.

Beam-based mobility procedures (e.g., to select different beams based on channel conditions) may be implemented using a variant of existing mobility procedures, but repeated with (reference signals transmitted using) different beams. For example, starting from primary synchronization signal (PSS) and/or secondary synchronization signal (SSS) to subsequent signals based on transmit/receive (Tx/Rx) beam pairs.

Aspects of the present disclosure provide a beam selection mechanism for such RAT networks for downlink-based, uplink-based, and hybrid uplink-downlink-based mobility scenarios.

Example Beam Selection for Uplink-Based Mobility

For UL based mobility (which may also be referred to as UE-Centric Mobility as it is based on UL reference signals transmitted by a UE), design targets may be reduced network RS transmission for energy saving, improved handover reliability, reduced handover frequency, and improved UE power saving.

Figure 15:
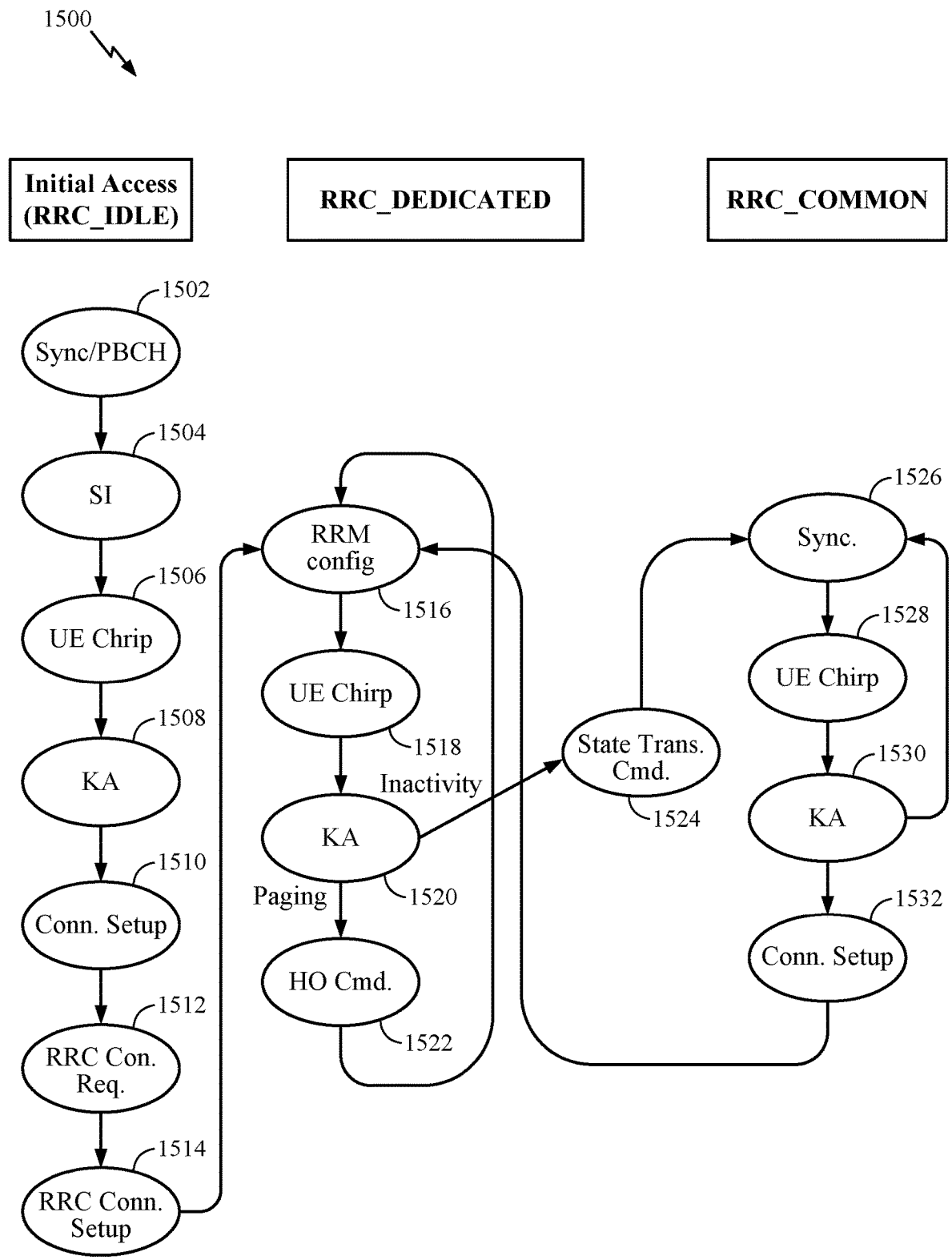
FIG. 15 illustrates an example state diagram showing example UE-centric uplink-based mobility, in accordance with certain aspects of the disclosure.

FIG. 15 is an example state diagram illustrating example UE-centric uplink-based mobility, in accordance with the disclosure. As illustrated in FIG. 15, the UE (e.g., UE 110) can perform an initial connection procedure at 1502-1514. The UE may be in an RRC_IDLE state during the initial access. In the RRC_IDLE state, the UE may have no dedicated resources. The UE may monitor a paging channel with a long discontinuous reception (DRX) cycle (e.g., around 320 ms-2560 ms). The UE can receive multimedia broadcast multicast service (MBMS) data while in this state. Cell selection can be performed for the initial access.

As shown in FIG. 15, at 1502, the UE monitors the synchronization channel found during cell selection, for example, for a primary synchronization signal (PSS) or secondary SS (SSS). Once the UE is synchronized, the UE can receive physical broadcast channel (PBCH) and system information (SI) at 1504. At 1506, the UE sends an uplink reference signal (e.g., chirp) and, at 1508, receives a "keep alive" (KA). The KA can indicate whether the network has data for the UE (e.g., paging indicator=TRUE or FALSE). At 1510, the UE may receive connection setup information, for example, which may include the information to decode dedicated channel information, such as cell-ID, C-RNTI, timing advance (TA) information and/or resource allocation (RA) information for the UE. The UE can use the allocated resources to transmit an RRC connection request message at 1512. At 1514, the UE can receive the RRC connection setup from the BS. This may complete initial access and the UE may enter the RRC dedicated state, which may also be referred to as the RRC-CONNECTED mode.

In the RRC dedicated state, the UE may perform the steps 1516-1522 illustrated in FIG. 15. In RRC dedicated state, the UE may have C-RNTI and dedicated resources. In the RRC dedicated state, for network controlled mobility, the UE monitors KA signals (e.g., a physical layer (PHY) signal) with a short DRX cycle (e.g., 2 ms-640 ms), sends uplink reference signals (and also CQI), and uses a TA. The resource for the uplink reference signal may be UE specific resource (e.g., similar to sounding reference signal) assigned by the BS. As shown in FIG. 15, at 1516, the UE receives radio resource management (RRM) configuration information from the BS. The RRM configuration information may relate to a mobility configuration for the UE. At 1518, the UE sends the uplink reference signal according to the RRM configuration information. At 1520, the UE monitors for the KA signal. If the KA signal indicates data for the UE, the UE monitors the downlink channel. At 1522, the UE may receive a handover command in the downlink channel. In this case, the UE remains in the RRC dedicated state and may repeat the steps 1516-1522 with the new (e.g., target) BS after the handover. On the other hand, if the KA signal does not indicate paging for the UE (e.g., after a period of inactivity), then the UE may receive a state transition command at 1524 and transition to the RRC common state. The RRC common state may also be referred to as the RRC inactive state, the RRC DORMANT state, or the Energy Conserved Operation (ECO) state. The RRC common or RRC inactive state may be a substrate of the RRC_CONNECTED state or of the RRC_IDLE suspend mode. The terms may be used interchangeably.

In the RRC common state or RRC inactive state, the UE may perform the steps 1526-1532 illustrated in FIG. 15. In the RRC common state, the UE may have RRC common radio network temporary identifier (RC-RNTI, e.g., Z-RNTI or C-RNTI) and common resources (e.g., rather than dedicated resources). In the RRC common state the network can control serving node changes. As shown in FIG. 15, at 1526, the UE monitors for synchronization and, at 1528 sends an uplink reference signal. The uplink reference signal may include a UE-ID and/or a buffer status report (BSR) of the UE. The UE may stay in the RRC common state until it receives a KA signal, at 1530, that indicates activity for the user (or the UE has data to transmit), at which time the UE may perform connection setup at 1532 to transition to the RRC_CONNECTED state. As illustrated, in RRC common state, the uplink reference signal may be used to make serving node change decisions. For example, the KA signal may indicate the paging indication and the UE may repeat the steps 1526-1530 until the KA signal indicates user plane activity for the UE. If serving cell change takes place, the network may autonomously change the serving cell without indicating paging indicator=TRUE for the HO command.

According to certain aspects, for uplink-based mobility, the handover decision (transmission point selection) by the BS may be based on measurement of the uplink reference signal from the UE. For uplink-based mobility, the BS may not send measurement reference signals (MRS) to the UE. Beam selection may also be performed by the BS based on the uplink reference signal from the UE.

Figure 16:
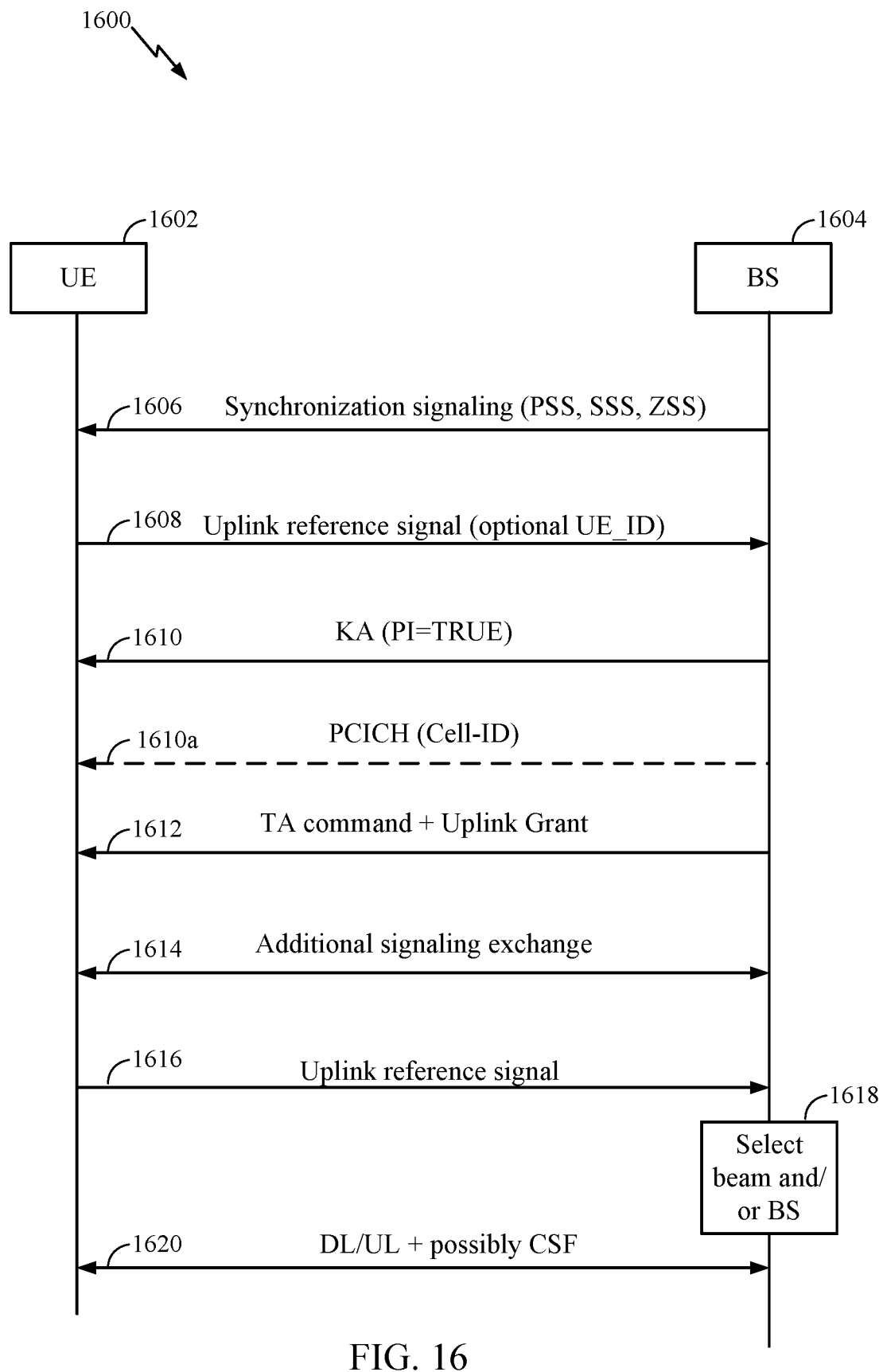
FIG. 16 is call flow diagram illustrating beam selection for uplink-based mobility, in accordance with aspects of the present disclosure.

FIG. 16 is an example call flow diagram 1600 illustrating beam selection for uplink-based mobility, in accordance with aspects of the present disclosure. The call flow 1600 is more generalized version of the state diagram shown in FIG.

15 for uplink-based mobility, and also shows the beam selection (not shown in FIG. 15). As shown in FIG. 16, at 1606, the UE 1602 can monitor synchronization signals for acquisition (e.g., shown in FIG. 15). The synchronization signals may include PSS, SSS, and/or zone SS (ZSS). At 1608, the UE 1602 sends uplink reference signals which may optionally include UE_ID. The uplink reference signals may be similar to Msg 1 and Msg 3 signaling of a random access (RA) procedure in the LTE system. At 1610, the UE 1602 receives a KA signal (e.g., with PI=TRUE) from the BS 1604. Optionally, 1610a, after receiving the KA signal, the UE 1602 receives a Physical Cell Identity Channel (PCICH) indicting a cell-ID. At 1612, the UE 1602 receives C-RNTI, timing advance (TA) and/or uplink grant from the BS 1604. This may be similar to Msg 2 and Msg 4 of the RA procedure. At 1615, the UE 1602 and BS 1604 can exchange addition signaling similar to the conventional LTE signaling performed after Msg 4 (e.g., completion of the RA procedure) and information configuring the uplink reference signal.

At 1616, the UE 1602 can transmit uplink reference signal(s) to the BS 1604. The BS 1604 can measure the uplink reference signal(s) from the UE 1602 and, at 1618, select the downlink beam and/or BS based on the measurements. At 1620, the UE 1602 and BS 1604 can transmit uplink and/or downlink data. In addition, channel state feedback (CSF) can be transmitted.

Example Beam Selection for Downlink-Based Mobility

Figure 17:
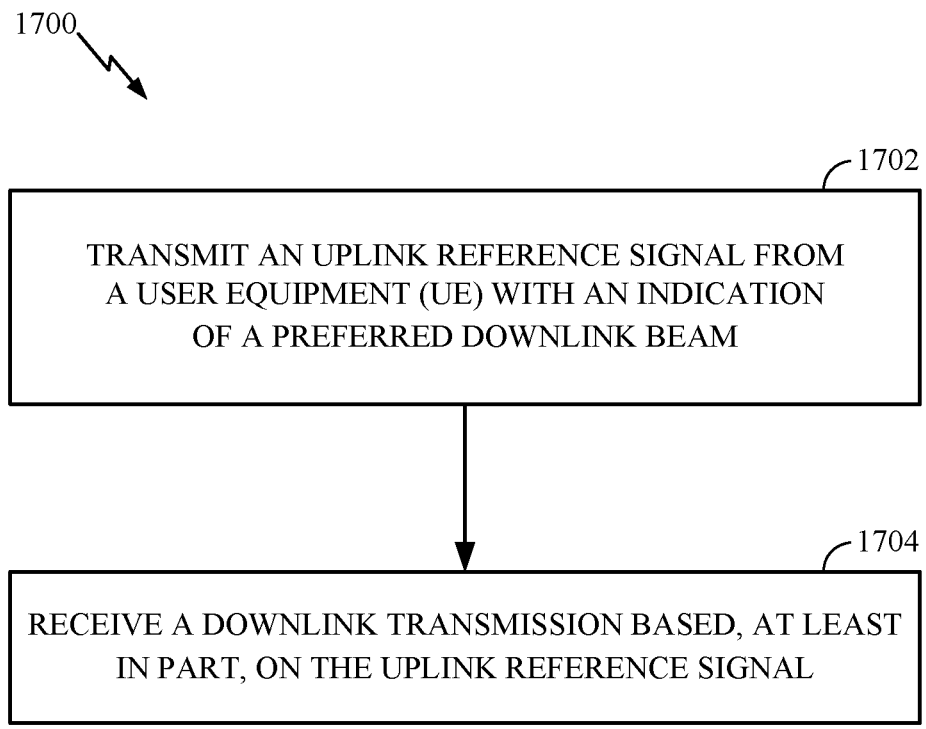
FIG. 17 illustrates example operations, performed by a UE, for beam selection for downlink-mobility, in accordance with certain aspects of the disclosure.

FIG. 17 illustrates example operations 1700 for beam selection for downlink-based mobility, in accordance with certain aspects of the disclosure. The operations 1700 may be performed by a UE (e.g., UE 110). The operations 1700 may be performed by one or more components of UE 650 illustrated in FIG. 6. For example, one or more of the antenna 652, transceiver 654, controller/processor 659, and memory 660 may be configured to perform the operations 1700.

At 1702, the UE transmits an uplink reference signal with an indication of a preferred downlink beam. The uplink reference signal may include a UE ID. In some cases, the preferred beam may be selected (and the uplink reference signal transmitted) during a connection establishment procedure. Alternatively, the uplink reference signal with the preferred beam may be transmitted after completion of the connection establishment procedure. The selection of the preferred beam may be based on MRSs received from the BS.

At 1704, the UE receives a downlink transmission based, at least in part, on the uplink reference signal. For example, the UE can receive beamformed downlink transmissions based on the preferred beam or the UE can receive a handover command based on the uplink reference signal.

Figure 18:
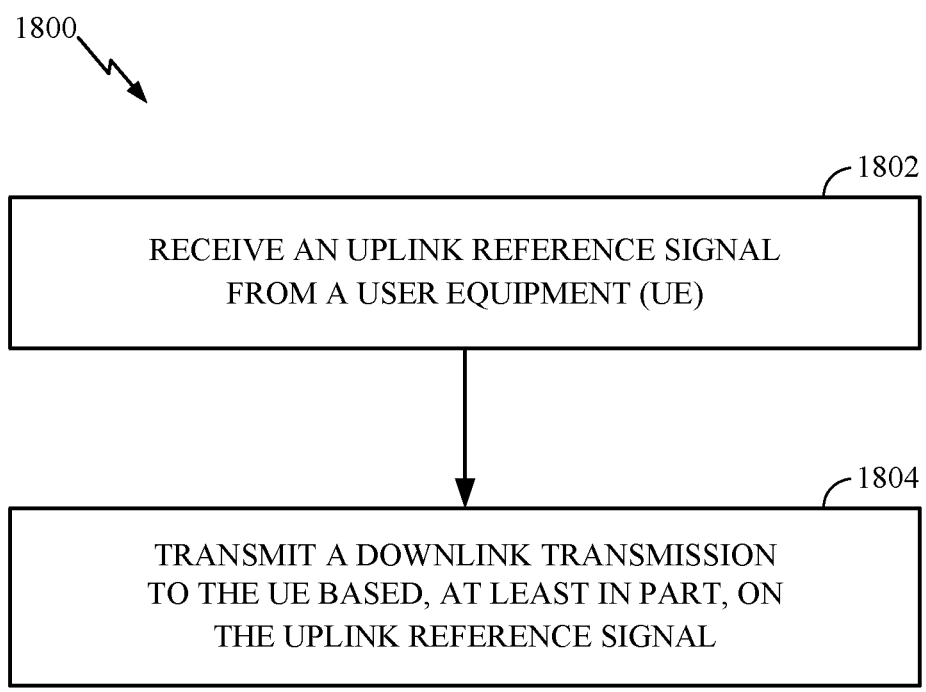
FIG. 18 illustrates example operations, performed by a BS, for beam selection for downlink-based mobility, in accordance with certain aspects of the disclosure.

FIG. 18 illustrates example operations 1800 for beam selection for downlink-based mobility, according to aspects of the present disclosure. The operations 1800 may be performed by a BS such as BS 122. The operations 1800 may be performed by one or more components of BS 610 illustrated in FIG. 6. For example, one or more of the antenna 620, transceiver 618, controller/processor 675, and memory 676 may be configured to perform the operations 1800. The operations 1800 may be complementary operations performed by the BS to the operations 1700 performed by the UE.

At 1802, the BS receives an uplink reference signal with an indication of a preferred downlink beam. At 1804, the BS transmits a downlink transmission based, at least in part, on the uplink reference signal.

Figure 19:
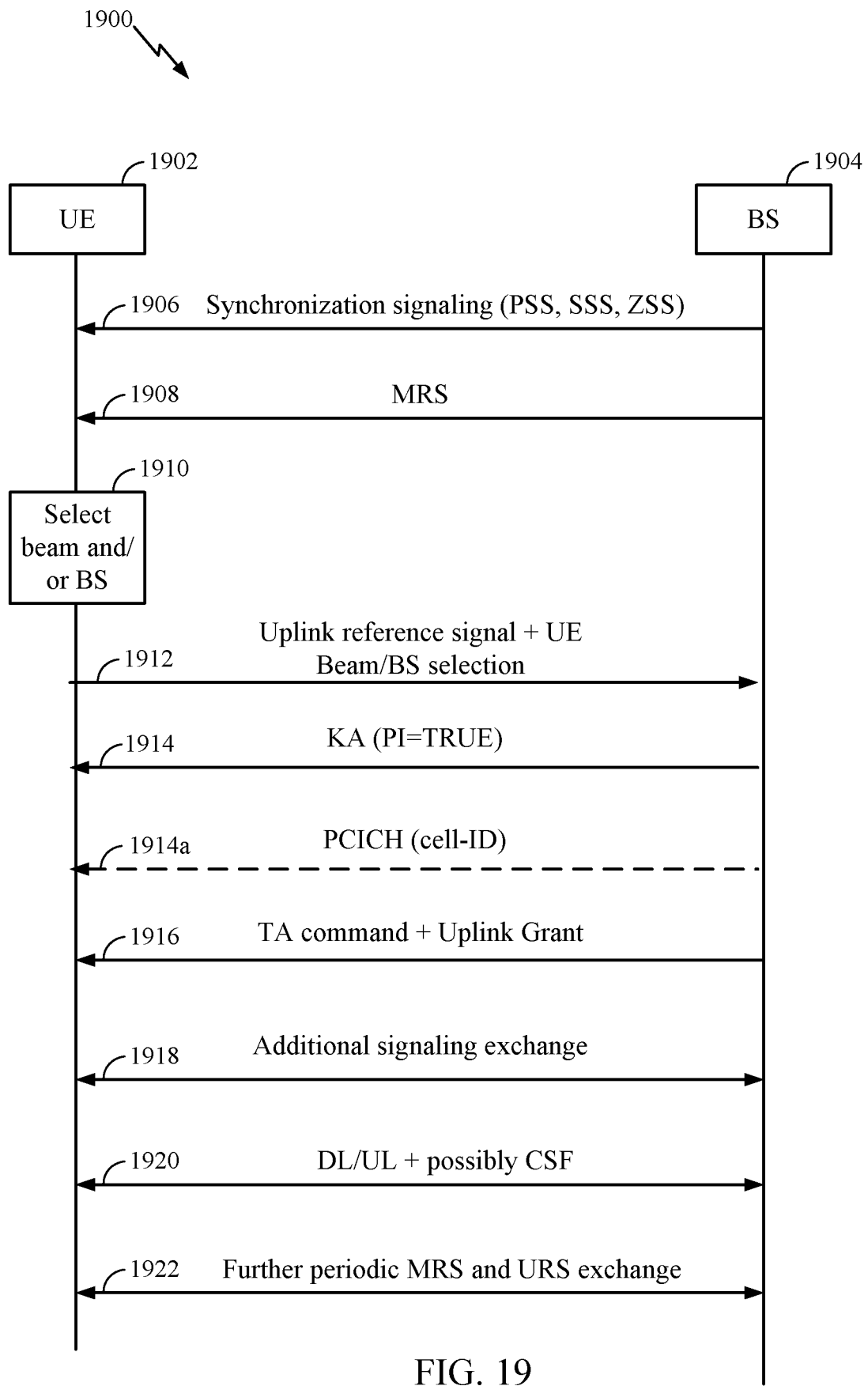
FIG. 19 illustrates an example call flow diagram for beam selection, during an initial access procedure, for downlink-based mobility, in accordance with certain aspects of the disclosure.
Figure 20:
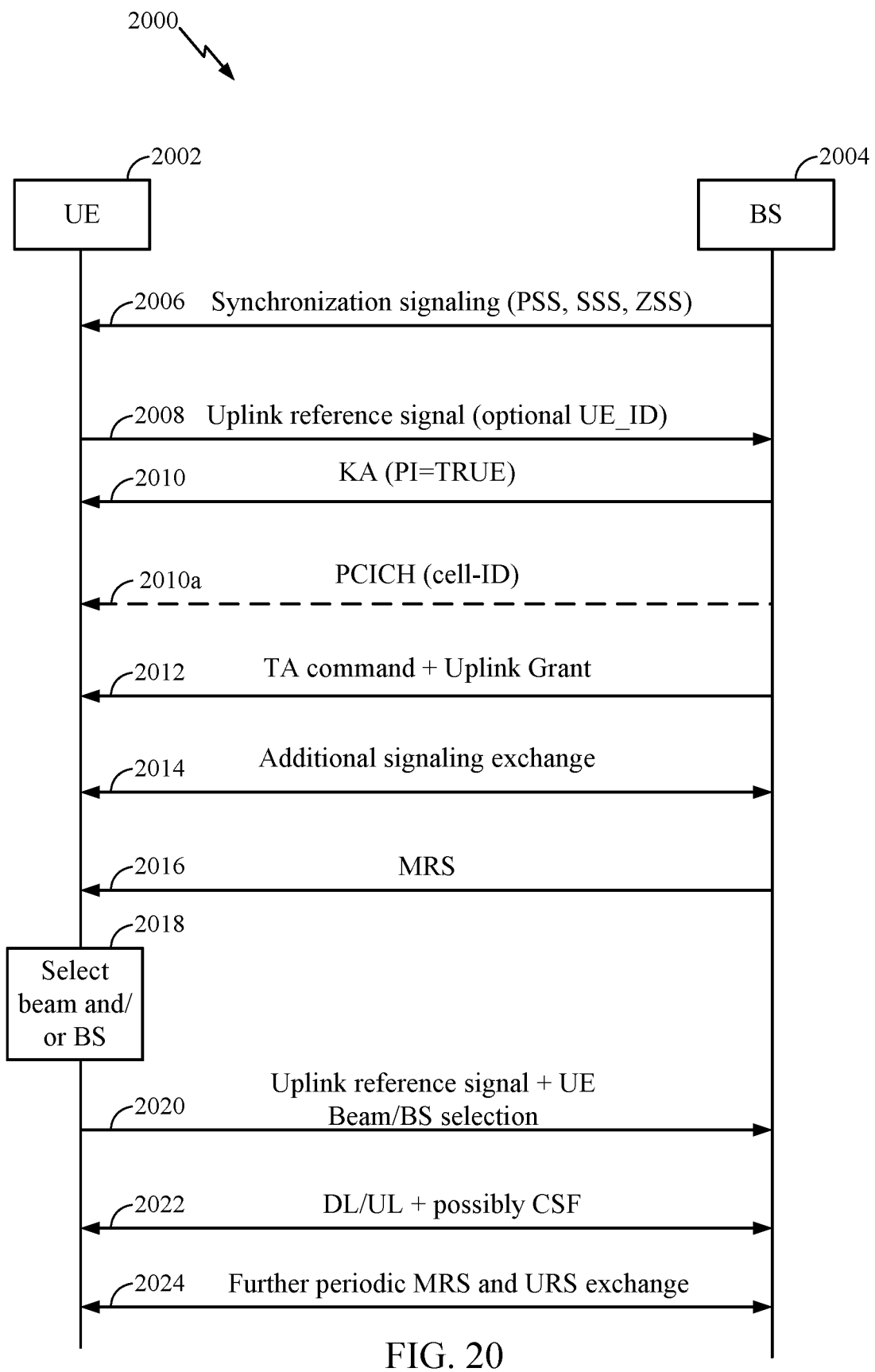
FIG. 20 illustrates an example call flow diagram for beam selection, after an initial access procedure, for downlink-based mobility, in accordance with certain aspects of the disclosure.

FIGS. 19 and 20 illustrate example call flow diagrams for beam selection for downlink-based mobility. For DL-based mobility, the network relies on feedback provided from the UE after measuring MRS (measurement reference signals). In some cases, the MRS may be transmitted using different beams, such that the feedback is used to select a preferred beam for DL transmissions. According to certain aspects, in an inter-BS beam management scheme, multiple different beams may be transmitted by multiple different BSs.

Example Beam Selection During Initial Access

According to certain aspects, the UE can send an uplink reference signal with an indication of preferred downlink beam (e.g., or an index of suitable downlink beams) during initial access. For example, the uplink reference signal can be in the first message sent from the UE to the BS.

As shown in FIG. 19, at 1906, the UE 1902 can monitor synchronization signals for acquisition. For downlink-based mobility case, at 1908, the BS 1904 sends reference signals (e.g., MRS) to the UE 1902. In the example illustrated in FIG. 19, the MRS are sent during initial access. The MRS may use different beams, such that the UE 1902 can measure the MRS and select a preferred beam and/or a preferred BS, at 1910. In some cases, the UE 1502 may receive the MRS using different beamforming from multiple BSs Then, at 1912, during the initial access (e.g., in the first message from the UE 1902 to the BS 1904), the UE 1902 sends an uplink reference signal with an indication of the preferred downlink beam and/or BS. In some cases, the indication of the preferred beam may be an index of suitable downlink beams. The uplink reference signal may optionally include UE_ID.

At 1914, the UE 1902 receives a KA signal (e.g., with PI=TRUE) from the BS 1904. Optionally, 1914a, after receiving the KA signal, the UE 1902 receives a Physical Cell Identity Channel (PCICH) indicting a cell-ID. At 1916, the UE 1902 receives C-RNTI, TA and uplink grant from the BS 1904. At 1918, the UE 1902 and BS 1904 can exchange addition signaling similar to the conventional LTE signaling performed after Msg 4 (e.g., completion of the RA procedure) and information configuring the uplink reference signal. At 1920, the UE 1902 and BS 1904 can exchange uplink and downlink data and possibly CSF. The downlink data from the BS 1904 may be beamformed according to the preferred beam indicated by the UE 1902. The BS 1904 can also make mobility decisions and send a handover command based on the uplink reference signal, such as based on the indication of the preferred beam and/or BS.

As illustrated in FIG. 19, beam selection may continue after initial connection. At 1922, further transmissions of uplink reference signals from the UE 1902 (with an indication of a preferred downlink beam and/or BS) and MRS from the BS 1904 may occur. The transmissions may be periodic and may have different configured periodicities. The further MRS and uplink reference signals can be used to optimize the beam selection.

Example Beam Selection After Initial Access

According to certain aspects, the MRS measurement and beam selection may not occur until after completion of the initial access procedure as shown in FIG. 16.

As shown in FIG. 20, the initial transmissions 2006-2014 may similar to the transmissions at 1606-1614 for the uplink-based mobility procedure illustrated in FIG. 16. At 2006, the UE 2002 can monitor synchronization signals for acquisition. At 2008, the UE 2002 sends an uplink reference signal which may optionally include UE ID—but does not include the indication of the preferred downlink beam and/or transmission reception point.

At 2010, the UE 2002 receives a KA signal (e.g., with PI=TRUE) from the BS 2004. Optionally, 2010a, after receiving the KA signal, the UE 2010 receives a Physical Cell Identity Channel (PCICH) indicting a cell-ID. At 2012, the UE 2002 receives TA and uplink grant from the BS 2004. At 2014, the UE 2002 and BS 2004 can exchange addition signaling similar to the conventional LTE signaling performed after Msg 4 (e.g., completion of the RA procedure) and information configuring the uplink reference signal.

After the initial access procedure is completed, at 2016, the BS 2004 sends reference signals (e.g., MRS) to the UE 2002. In some cases, multiple BSs may send reference signals to the UE 2002. The UE 2002 can measure the MRS and select a preferred beam and/or a preferred BS, at 2018. Then, at 2020, the UE 2002 sends an uplink reference signal with the indication of the preferred downlink beam and/or BS.

At 2022, the UE 2002 and BS 2004 can exchange uplink and downlink data and possibly CSF. The downlink data from the BS 2004 may be beamformed according to the preferred downlink beam indicated by the UE 2002. The BS 2004 can also make mobility decisions and send a handover command based on the uplink reference signal, such as based on the indication of the preferred beam and/or BS. At 2022, further transmissions of uplink reference signals from the UE 2002 (with an indication of a preferred downlink beam and/or BS) and MRS from the BS 2004 may occur. The transmissions may be periodic and may have different configured periodicities. The further MRS and uplink reference signals can be used to optimize the beam selection.

Example Beam Selection for Hybrid Uplink-Downlink-Based Mobility

According to certain aspects a hybrid uplink and downlink based mobility and beam selection approach may be used. In the hybrid approach, transmission reception point and/or beam selection decisions can be based on both uplink and downlink reference signals. For example, similar to uplink-based mobility, mobility (e.g., handover) decisions by the BS can be based on the uplink reference signal. However, the beam selection can be done by the UE and included in the uplink reference signal and based on measurement of MRS with different beams transmitted by the BS.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for wireless communication by a user equipment (UE), comprising:
   transmitting a random access channel (RACH) message containing an index indicating a plurality of preferred downlink beams; and
   receiving a random access response (RAR) message using one of the plurality of preferred downlink beams.

2. The method of claim 1, further comprising:
   receiving one or more measurement reference signals transmitted using different beams; and
   selecting the plurality of preferred downlink beams based on the one or more measurement reference signals.

3. The method of claim 2, wherein receiving the one or more measurement reference signals comprises receiving the one or more measurement reference signals from a plurality of cells.

4. The method of claim 3, wherein the plurality of preferred downlink beams indicates one or more selected transmission points associated with the plurality of preferred downlink beams.

5. The method of claim 1, wherein the RACH message includes a RACH preamble and a radio resource control (RRC) connection request.

6. The method of claim 1, wherein the RAR message includes a timing advance (TA), uplink grant, and radio resource control (RRC) connection complete indication.

7. The method of claim 1, wherein the RACH message is sent during initial access.

8. The method of claim 7, wherein the RACH message includes a UE identification (UE ID).

9. The method of claim 1, wherein the RACH message is sent after initial access while the UE is in a connected state.

10. The method of claim 9, wherein the RACH message does not include an identification (ID) of the UE.

11. The method of claim 1, further comprising receiving a handover command based on the RACH message.

12. A method for wireless communication by a base station (BS), comprising:
   receiving a random access channel (RACH) message from a user equipment (UE) containing an index indicating a plurality of preferred downlink beams; and transmitting a random access response (RAR) message to the UE using one of the plurality of preferred downlink beams.

13. The method of claim 12, further comprising transmitting one or more measurement reference signals to the UE using different beams, wherein the plurality of preferred downlink beams comprises one or more of the different beams.

14. The method of claim 12, wherein the plurality of preferred downlink beams indicates one or more selected transmission points associated with the plurality of preferred downlink beams.

15. The method of claim 12, wherein the RACH message includes a RACH preamble and a radio resource control (RRC) connection request.

16. The method of claim 12, wherein the RAR message includes a timing advance (TA), uplink grant, and radio resource control (RRC) connection complete indication.

17. The method of claim 12, wherein the RACH message is received during initial access.

18. The method of claim 17, wherein the RACH message includes a UE identification (UE ID).

19. The method of claim 12, wherein the RACH message is received after initial access while the UE is in a connected state.

20. The method of claim 19, wherein the RACH message does not include an identification (ID) of the UE.

21. The method of claim 12, further comprising transmitting a handover command to the UE based on the RACH message.

22. An apparatus for wireless communication, comprising:
a memory; and
at least one processor coupled with the memory, wherein the at least one processor is configured to:
transmit a random access channel (RACH) message containing an index indicating a plurality of preferred downlink beams; and
receive a random access response (RAR) message using one of the plurality of preferred downlink beams.

23. The apparatus of claim 22, wherein the at least one processor is further configured to:
receive one or more measurement reference signals transmitted using different beams; and
select the plurality of preferred downlink beams based on the one or more measurement reference signals.

24. The apparatus of claim 23, wherein the at least one processor is configured to receive the one or more measurement reference signals from a plurality of cells.

25. The apparatus of claim 24, wherein the plurality of preferred downlink beams indicates one or more selected transmission points associated with the plurality of preferred downlink beams.

26. The apparatus of claim 22, wherein the RACH message includes a RACH preamble and a radio resource control (RRC) connection request.

27. An apparatus for wireless communication, comprising:
a memory; and
at least one processor coupled with the memory, wherein the at least one processor is configured to:
receive a random access channel (RACH) message from a user equipment (UE) containing an index indicating a plurality of preferred downlink beams; and
transmit a random access response (RAR) message to the UE using one of the plurality of preferred downlink beams.

28. The apparatus of claim 22, wherein the at least one processor is further configured to transmit one or more measurement reference signals to the UE using different beams, wherein the plurality of preferred downlink beams comprises one or more of the different beams.

29. The apparatus of claim 27, wherein the RAR message includes a timing advance (TA), uplink grant, and radio resource control (RRC) connection complete indication.

30. The apparatus of claim 27, wherein the at least one processor is further configured to transmit a handover command to the UE based on the RACH message.

* * * * *